(12) United States Patent
Kim

(10) Patent No.: US 11,373,216 B2
(45) Date of Patent: Jun. 28, 2022

(54) METHOD, SERVER, AND COMPUTER PROGRAM FOR MEDIATING ADVERTISEMENT BASED ON BLOCK CHAIN

(71) Applicant: Kakao Games Corp., Seongnam-si (KR)

(72) Inventor: Suhyoung Kim, Seongnam-si (KR)

(73) Assignee: KAKAO GAMES CORP., Gyeonggi-Do (KR)

( * ) Notice: Subject to any disclaimer, the term of this patent is extended or adjusted under 35 U.S.C. 154(b) by 327 days.

(21) Appl. No.: 16/421,331

(22) Filed: May 23, 2019

(65) Prior Publication Data
US 2019/0362392 A1 Nov. 28, 2019

(30) Foreign Application Priority Data
May 24, 2018 (KR) .......................... 10-2018-0058973

(51) Int. Cl.
*G06Q 40/00* (2012.01)
*G06Q 30/02* (2012.01)
(Continued)

(52) U.S. Cl.
CPC ....... *G06Q 30/0272* (2013.01); *G06Q 20/065* (2013.01); *G06Q 20/223* (2013.01);
(Continued)

(58) Field of Classification Search
CPC ... G06Q 10/063; G06Q 30/02; G06Q 30/0242
See application file for complete search history.

(56) References Cited

U.S. PATENT DOCUMENTS

2008/0109285 A1* 5/2008 Reuther ............. G06Q 30/0242
707/999.005
2008/0212758 A1* 9/2008 Baiz Matuk ....... G06Q 30/0273
379/207.13
(Continued)

FOREIGN PATENT DOCUMENTS

KR 10-0867088 B1 11/2008
KR 10-2016-0143172 A 6/2015

OTHER PUBLICATIONS

ThriveHive (How To Reach Out to Bloggers & Social Media Influencers, https://thrivehive.com/how-to-reach-out-to-bloggers-social-media-influencers/, Aug. 22, 2016) (Year: 2016).*

*Primary Examiner* — Elizabeth H Rosen
*Assistant Examiner* — Mark H Gaw
(74) *Attorney, Agent, or Firm* — Umberg Zipser LLP; Ryan Dean

(57) ABSTRACT

According to an exemplary embodiment of the present disclosure, a computer program stored in a computer readable storage medium is disclosed. The computer program includes commands causing a computer to perform operations below, the operations including: receiving first information about an advertisement transaction request, second information about a reward payment condition, and a sealed first coin from an advertiser device; receiving advertisement selection information from an advertisement agency; generating an advertisement page based on the first information when the advertisement selection information corresponds to the first information; transmitting the advertisement page to the advertisement agency to cause the advertisement page to be exposed through the advertisement agency; transmitting the second coin to the advertisement agency based on the second information and transmitting the sealed third coin to the advertisement exposure target according to a reception of an application signal from the advertisement exposure (Continued)

target through the advertisement page; and when the reward payment condition is satisfied, transmitting a first key corresponding to the second coin to the advertisement agency, and transmitting the second key corresponding to the third coin to the advertisement exposure target.

18 Claims, 11 Drawing Sheets

(51) Int. Cl.
*G06Q 20/36* (2012.01)
*G06Q 20/38* (2012.01)
*G06Q 20/06* (2012.01)
*G06Q 20/22* (2012.01)

(52) U.S. Cl.
CPC ....... *G06Q 20/367* (2013.01); *G06Q 20/3678* (2013.01); *G06Q 20/3827* (2013.01); *G06Q 20/3829* (2013.01); *G06Q 30/0246* (2013.01); *G06Q 30/0273* (2013.01); *G06Q 2220/00* (2013.01)

(56) References Cited

U.S. PATENT DOCUMENTS

| | | | |
|---|---|---|---|
| 2009/0327081 A1* | 12/2009 | Wang | G06Q 30/02 |
| | | | 705/14.66 |
| 2013/0325573 A1* | 12/2013 | Park | G06Q 30/0241 |
| | | | 705/14.16 |
| 2015/0019307 A1* | 1/2015 | Girard | G06Q 30/0207 |
| | | | 705/14.1 |
| 2018/0232526 A1* | 8/2018 | Reid | H04L 9/3239 |
| 2019/0130398 A1* | 5/2019 | Brown | G06Q 20/3825 |

* cited by examiner

METHOD, SERVER, AND COMPUTER PROGRAM FOR MEDIATING ADVERTISEMENT BASED ON BLOCK CHAIN

TECHNICAL FIELD

The present disclosure relates to a method, a server, and a computer program for mediating an advertisement based on a block chain.

BACKGROUND ART

According to an expansion of a network infrastructure, such as mobile communication and wired/wireless Internet, there are the increasing number of advertisers who prefer network-based advertising materials as advertising means.

Korean Patent No. 10-0867088 presents a viral marketing method for a promotion product and a system for performing the method.

An advertiser finds an advertisement agency providing advertising media for an advertising activity. The advertisement agency checks whether it is possible to execute an advertisement desired to be published by the advertiser. Then, a particular advertisement contract is made under an agreement between the advertiser and the advertisement agency.

It takes a lot of time for the advertiser to find an advertisement agency and determine whether the cost of the advertisement is reasonable. Further, the process of a negotiation for making the contract requires a lot of time and attention from both the advertiser and the advertisement agency.

Accordingly, many advertisers make advertisement contracts with advertisement agencies through agents. That is, the agent mediates an advertisement contract between an advertiser and an advertisement agency and is responsible for all of the adjustments involved.

In this case, the advertiser may easily use an advertisement agency, but inevitably needs to pay more than a direct contract.

Further, in the case of some advertisement transactions in which indirect transactions occur, not direct transactions, between contract parties, transparency of transactions becomes cloudy.

Accordingly, there is a need in the industry for a system to reduce the cost and time required for concluding an advertisement transaction.

Simultaneously, there is a need in the industry for a method of mediating an advertisement through a smart contract for concluding a transparent and fair transaction.

Further, there is a need in the industry for accurately predicting the amount and type of traffic that results from an advertisement.

RELATED ART LITERATURE

Patent Document (Patent Document 1) Korean Patent Application Laid-Open No. 10-2016-0143172

SUMMARY OF THE INVENTION

The present disclosure is conceived in response to the foregoing background art, and to provide a user with an advertisement mediating service based on a block chain.

The technical objects of the present disclosure are not limited to the foregoing technical objects, and other non-mentioned technical objects will be clearly understood by those skilled in the art from the description below.

According to an exemplary embodiment of the present disclosure for solving the foregoing object, a computer program stored in a computer readable storage medium is disclosed. The computer program includes commands causing a computer to perform operations below, the operations including: receiving first information about an advertisement transaction request, second information about a reward payment condition, and a sealed first coin from an advertiser device; receiving advertisement selection information from an advertisement agency; generating an advertisement page based on the first information when the advertisement selection information corresponds to the first information; transmitting the advertisement page to the advertisement agency to cause the advertisement page to be exposed through the advertisement agency; transmitting the second coin to the advertisement agency based on the second information and transmitting the third coin to the advertisement exposure target according to a reception of an application signal from the advertisement exposure target through the advertisement page; and when the reward payment condition is satisfied, transmitting a first key corresponding to the second coin to the advertisement agency, and transmitting the second key corresponding to the third coin to the advertisement exposure target.

The operations may further include: transmitting a settlement request signal to the advertiser device; and receiving a third key corresponding to the first coin.

The transmitting of the settlement request signal to the advertiser device may include transmitting the settlement request signal to the advertiser device when a predetermined time elapses.

The transmitting of the settlement request signal to the advertiser device may include transmitting the settlement request signal to the advertiser device when the number of advertisement agencies receiving the second coin and the number of advertisement exposure targets receiving the third coin correspond to the predetermined numbers.

The transmitting of the second coin to the advertisement agency and the transmitting of the third coin to the advertisement exposure target may include: generating a first transaction according to the transmission of the second coin and the third coin; and generating the first transaction to a plurality of nodes, and when the first transaction is verified through a consensus algorithm, generating a first block in each of the plurality of nodes to cause the first transaction to be recorded in the first block.

The transmitting of the first key corresponding to the second coin to the advertisement agency and the transmitting of the second key corresponding to the third coin to the advertisement exposure target may include: generating a second transaction according to the transmission of the first key and the second key; transmitting the second transaction to the plurality of nodes; and when the second transaction is verified through the consensus algorithm, generating a second block in each of the plurality of nodes to cause the second transaction to be recorded in the second block according to the transmission of the second transaction to the plurality of nodes.

The receiving of the third key corresponding to the first coin may include: generating a third transaction according to the reception of the third key; transmitting the third transaction to the plurality of nodes, and when the third transaction is verified through the consensus algorithm, generating a third block in each of the plurality of nodes to cause the third transaction to be recorded in the third block.

The second information may include at least one of information about the number of second coins and the number of third coins, information related to the division of the sealed first coin, and information related to the transmission of the first key and the second key.

The first key may be a key which unseals the sealed second coin and converts the sealed second coin to a usable coin, and the second key may be a key which unseals the sealed third coin and converts the sealed third coin to a usable coin.

The transmitting of the first key corresponding to the second coin to the advertisement agency, and the transmitting of the second key corresponding to the third coin to the advertisement exposure target when the reward payment condition is satisfied may include: when the reward payment condition is satisfied, receiving a first public key of the advertisement agency and a second public key of the advertisement exposure target; transmitting first data obtained by encrypting the first key with the first public key to the advertisement agency; and transmitting second data obtained by encrypting the second key with the second public key to the advertisement exposure target.

The transmitting of the settlement request signal to the advertiser device may include: generating a third public key and a private key corresponding to the third public key; and transmitting the third public key to the advertiser device together with the settlement request signal.

The receiving of the third key corresponding to the first coin may include: receiving third data obtained by encrypting the third key with the third public key; extracting the third key by decrypting the third data by using the private key; and unsealing the sealed first coin by using the third key.

The first transaction may be recognized to be verified through the consensus algorithm when any one of the plurality of nodes extracts a first nonce value satisfying a predetermined first condition and the first nonce value is recognized to be valid in each of the plurality of nodes.

The predetermined first condition may be satisfied when a hash value of the first block generated when information stored in a header of the first block and the first nonce value are transformed through the hash algorithm is smaller than a difficulty value of the first block.

The second transaction may be recognized to be verified through the consensus algorithm when any one of the plurality of nodes extracts a second nonce value satisfying a predetermined second condition and the second nonce value is recognized to be valid in each of the plurality of nodes.

The predetermined second condition may be satisfied when a hash value of the second block generated when information stored in a header of the second block and the second nonce value are transformed through the hash algorithm is smaller than a difficulty value of the second block.

The third transaction may be recognized to be verified through the consensus algorithm when any one of the plurality of nodes extracts a third nonce value satisfying a predetermined third condition and the third nonce value is recognized to be valid in each of the plurality of nodes.

The predetermined third condition may be satisfied when a hash value of the third block generated when information stored in a header of the third block and the third nonce value are converted through the hash algorithm is smaller than a difficulty value of the third block.

The sealed first coin, the sealed second coin, and the sealed third coin may be the coins in the freezing state which cannot be transmitted to another entity within a block chain network by a hold command until the hold command is released.

The reward payment condition may be satisfied when the advertisement exposure target accesses a web site for installing a specific application through the advertisement page and then installs the specific application.

The reward payment condition may be satisfied when the advertisement exposure target installs a specific game application through the advertisement page and then achieves a predetermined level in the specific game application.

The reward payment condition may be satisfied when the advertisement exposure target touches an indicator related to watching a specific advertisement video through the advertisement page in a specific application and then watches the specific advertisement video.

According to another exemplary embodiment of the present disclosure for solving the foregoing object, a method of mediating an advertisement based on a block chain is disclosed. The method includes: receiving first information about an advertisement transaction request, second information about a reward payment condition, and a sealed first coin from an advertiser device; receiving advertisement selection information from an advertisement agency; generating an advertisement page based on the first information when the advertisement selection information corresponds to the first information; transmitting the advertisement page to the advertisement agency to cause the advertisement page to be exposed through the advertisement agency; transmitting the second coin to the advertisement agency based on the second information and transmitting the third coin to the advertisement exposure target according to a reception of an application signal from the advertisement exposure target through the advertisement page; and when the reward payment condition is satisfied, transmitting a first key corresponding to the second coin to the advertisement agency, and transmitting the second key corresponding to the third coin to the advertisement exposure target.

According to another exemplary embodiment of the present disclosure for solving the foregoing object, a server for mediating an advertisement based on a block chain is disclosed. The server includes: a reception unit configured to receive first information about an advertisement transaction request, second information about a reward payment condition, and a sealed first coin from an advertiser device; an advertisement management unit configured to generate an advertisement page based on the first information when advertisement selection information is received from an advertisement agency and the advertisement selection information corresponds to the first information, transmitting the advertisement page to the advertisement agency to cause the advertisement page to be exposed through the advertisement agency; a coin distributing unit configured to determine to transmit the second coin to the advertisement agency based on the second information and transmit the third coin to the advertisement exposure target according to a reception of an application signal from the advertisement exposure target through the advertisement page; and a key management unit configured to determine to transmit a first key corresponding to the second coin to the advertisement agency, and transmit the second key corresponding to the third coin to the advertisement exposure target when the reward payment condition is satisfied.

The technical solutions obtainable from the present disclosure are not limited to the foregoing solutions, and other non-mentioned solution means will be clearly understood by those skilled in the art from the description below.

The present disclosure may provide a user with the advertisement mediating method based on a block chain and a transaction method having high reliability.

BRIEF DESCRIPTION OF THE DRAWINGS

Hereinafter, various aspects are described with reference to the drawings, and similar reference numerals are used for indicating generally similar constituent elements. In the exemplary embodiments below, for the purpose of explanation, a plurality of specific detailed matters is presented for general understanding of one or more aspects. However, it is apparent that the aspect(s) may be implemented without the particular detailed matters.

DETAILED DESCRIPTION

Figure 1:
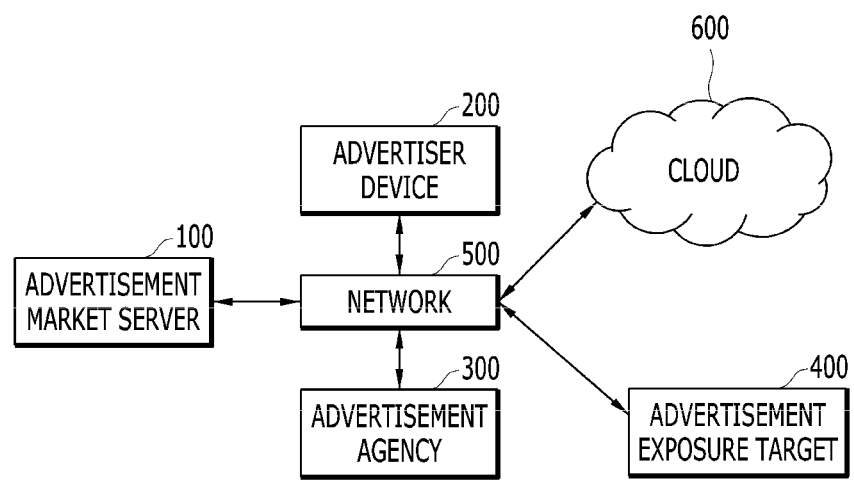
FIG. 1 is a diagram illustrating an example of an advertisement mediating system based on a block chain in which various aspects of the present disclosure are implementable.

Various exemplary embodiments and/or aspects are now disclosed with reference to the drawings. In the description below, the plurality of particular detailed matters are disclosed for helping general understanding of one or more aspects for the purpose of description. However, the point that the aspect(s) is executable even without the particular detailed matters may also be recognized by those skilled in the art. The subsequent description and the accompanying drawings describe specific illustrative aspects of one or more aspects in detail. However, the aspects are illustrative, and some of the various methods of various aspects of the principles may be used, and the descriptions intend to include the aspects and the equivalents thereof.

An "exemplary embodiment", an "example", an "aspect", an "illustration", and the like used in the present specification may not be construed to be better or have an advantage compared to a predetermined described aspect, an aspect having a different design, or designs.

A term "or" intends to mean comprehensive "or", not exclusive "or". That is, unless otherwise specified or when it is unclear in context, "X uses A or B" intends to mean one of the natural comprehensive substitutions. That is, when X uses A, X uses B, or X uses both A and B, "X uses A or B" may be applied to any one among the cases. Further, a term "and/or" used in the present specification shall be understood to designate and include all of the possible combinations of one or more items among the listed relevant items.

A term "include" and/or "including" means that a corresponding characteristic and/or a constituent element exists, but it shall be understood that the existence or an addition of one or more other characteristics, constituent elements, and/or a group thereof is not excluded. Further, unless otherwise specified or when it is unclear that a single form is indicated in context, the singular shall be construed to generally mean "one or more" in the present specification and the claims.

Terms "information" and "data" used in the present specification may be frequently used to be exchangeable with each other.

Hereinafter, the same or similar constituent element is denoted by the same reference numeral regardless of a reference numeral, and a repeated description thereof will be omitted. Further, in describing the exemplary embodiment disclosed in the present disclosure, when it is determined that detailed description relating to well-known functions or configurations may make the subject matter of the exemplary embodiment disclosed in the present disclosure unnecessarily ambiguous, the detailed description will be omitted. Further, the accompanying drawings are provided for helping to easily understand exemplary embodiments disclosed in the present specification, and the technical spirit disclosed in the present specification is not limited by the accompanying drawings.

Although "a first", "a second", and the like are used for describing various elements or constituent elements, but the elements or the constituent elements are not limited by the terms. The terms are used for discriminating one element or constituent element from another element or constituent element. Accordingly, a first element or constituent element mentioned below may also be a second element or constituent element within the technical spirit of the present disclosure as a matter of course.

Unless otherwise defined, all of the terms (including technical and scientific terms) used in the present specification may be used as a meaning commonly understandable by those skilled in the art. Further, terms defined in a generally used dictionary shall not be construed as being ideal or excessive in meaning unless they are clearly defined.

It should be understood that when one constituent element referred to as being "coupled to" or "connected to" another constituent element, one constituent element can be directly coupled to or connected to the other constituent element, but intervening elements may also be present. In contrast, when one constituent element is "directly coupled to" or "directly connected to" another constituent element, it should be understood that there are no intervening element present.

Suffixes, "module" and "unit", for a constituent element used for the description below are given or mixed in consideration of only easiness of the writing of the specification, and the suffix itself does not have a discriminated meaning or role.

Objects and effects, and technical configurations for achieving them will be clear when exemplary embodiments described in detail with reference to the accompanying drawings are referred to. In the following description of the present invention, a detailed description of known functions and configurations incorporated herein is omitted to avoid making the subject matter of the present invention unclear. In addition, the terminology used in the description is defined in consideration of the function of corresponding components used in the present invention and may be varied according to users, operator's intention, or practices.

However, the present disclosure is not limited to exemplary embodiments disclosed herein but will be implemented in various forms. The exemplary embodiments are provided so that the present disclosure is completely disclosed, and a person of ordinary skilled in the art can fully understand the scope of the present disclosure, and the present disclosure will be defined only by the scope of the appended claims. Therefore, the definitions should be made based on the entire contents of the specification.

FIG. 1 is a diagram illustrating an example of an advertisement mediating system based on a block chain in which various aspects of the present disclosure are implementable.

The advertisement mediating system based on a block chain according to exemplary embodiments of the present disclosure may include at least one of an advertisement market server 100, an advertiser device 200, an advertisement agency 300, an advertisement exposure target 400, a network 500, and a cloud 600. However, the constituent elements are not essential for implementing the advertisement mediating system, so that a smart transaction system may have constituent elements more or less than the listed constituent elements.

The advertisement market server 100, the advertiser device 200, the advertisement agency 300, the advertisement exposure target 400, and the cloud 600 according to exemplary embodiments of the present disclosure may mutually transceive data for a system according to the exemplary embodiments of the present disclosure through the network 500.

In the exemplary embodiments of the present disclosure, a "coin" may mean a cryptocurrency transacted online. For example, a coin may be a bitcoin, Ethereum, bitcoin gold, ripple, dash, light coin, and a Basic Attention Token (BAT). Further, a "coin" may be a "coin" of a block chain system which pays an interest (coin) at a fixed rate of hold to a person who owns the "coin". However, the present disclosure is not limited thereto, and various forms of cryptocurrency may be used as a coin according to the exemplary embodiments of the present disclosure.

In the exemplary embodiments of the present disclosure, "first information" means information about an advertisement transaction request generated by the advertiser device 200. For example, the first information may include information about advertisement cost, information about advertisement contents, and an advertisement contract request document. This will be described in detail below.

In the exemplary embodiments of the present disclosure, "second information" means information about a reward payment condition generated by the advertiser device 200.

Particularly, the reward payment condition included in the second information may include information about a condition under which a coin is paid to an advertisement exposure target and information about a condition under which a coin is paid to an advertisement agency. For example, the second information may include at least one of information on the number of sealed second coins first provided to an advertisement agency, information on the number of sealed third coins first provided to an advertisement exposure target, information about a division of the sealed first coin received from an advertiser device, and information related to a transmission of a first key and a second key.

In the exemplary embodiments of the present disclosure, the "sealed coin" means, for example, a coin which is unsealed through a "key" provided and is converted to a usable coin when a specific condition is satisfied. For example, the sealed first coin may be converted to the usable first coin through a third key corresponding to the first coin, and the scope of the present disclosure is not limited thereto. In another example, the "sealed coin" may also be a coin in a freezing state which cannot be transmitted to another entity within a block chain network until a hold command is released. Herein, the hold command may be released when a key corresponding to a sealed coin is received.

In the meantime, in relation to the present disclosure, the first coin may include information about the amount of coins paid to the advertisement market server.

According to several exemplary embodiments, the information about the amount of coins included in the first coin may be calculated by multiplying the number of customers (or the number of users to receive the first coin) by a customer transaction. For example, the first coin may be calculated by multiplying the number of advertisement exposure targets 400 and the number of advertisement agencies 300 by a customer transaction (a sum of total coins calculated based on information about the amount of coins (second coins) paid to the advertisement exposure target and information about the amount of coins (third coins) paid to the advertisement agency 300).

The coins described in the exemplary embodiments of the present disclosure are divided into the first coin, the second coin, and the third coin for description, but each coin simply means a coin sealed with a different key, and may be the same coin. Further, each of the first coin, the second coin, and the third coin simply expresses that the same coin has different amounts (for example, the first coin may mean 100 coins, the second coin may mean 50 coins, and the third coin may mean 30 coins), but does not mean a different coin.

The advertiser device 200 according to the exemplary embodiments of the present disclosure may include a Personal Computer (PC), a notebook computer, a mobile terminal, a smart phone, a table PC possessed by an advertiser, and may include all kinds of terminal accessible to a wired/wireless network.

The advertisement agency 300 may be any type of publisher, such as a blog, a social network (for example, Instagram, Facebook, and Twitter), games, and YouTube in which an advertisement is possible, than can advertise online. In relation to the present disclosure, it is defined that the advertisement agency 300 means a terminal of the publisher, and the advertisement agency 300 will be described below.

The advertisement exposure target 400 may be a user who watches an advertisement of the advertisement agency 300 in any form. In relation to the present disclosure, it is defined that the advertisement exposure target 400 means a terminal of the user, and the advertisement exposure target 400 will be described below.

A term "node" used in the present specification may be a server which is capable of exchanging data with at least one of an "advertisement target server", an "advertiser device", an "advertisement agency", and an "advertisement exposure target". However, the present disclosure is not limited thereto, and a node may be any device which is capable of exchanging data between the plurality of nodes.

The cloud 600 according to the exemplary embodiments of the present disclosure may include a plurality of nodes. The plurality of nodes included in the cloud 600 may share and store a generated transaction through the network 500. The plurality of nodes included in the cloud 600 may perform a function of recording a transaction in a block when a verification of the transaction is completed through a consensus algorithm of a block chain technology.

The network 500 according to the exemplary embodiments of the present disclosure may use various wired communication systems, such as a Public Switched Telephone Network (PSTN), an x Digital Subscriber Line (xDSL), a Rate Adaptive DSL (RADSL), a Multi Rate DSL (MDSL), a Very High speed DSL (VDSL), a Universal Asymmetric DSL (UADSL), a High Bit Rate DSL (HDSL), and a Local Area Network (LAN).

Further, the network 500 presented herein may use various wireless communication systems, such as Code Division Multi Access (CDMA), Time Division Multi Access (TDMA), Frequency Division Multi Access (FDMA), Orthogonal Frequency Division Multi Access (OFDMA), Single Carrier-FDMA (SC-FDMA), and other systems.

The network 500 according to the exemplary embodiments of the present disclosure may be configured regardless of a communication aspect, such as wired communication and wireless communication, and may be configured by various communication networks, such as a Personal Area Network (PAN) and a Wide Area Network (WAN). Further, the network may be a publicly known World Wide Web (WWW), and may also use a wireless transmission technology used in short range communication, such as Infrared Data Association (IrDA) or Bluetooth.

The technologies described in the present specification may also be used in other networks, as well as the foregoing networks.

Figure 2:
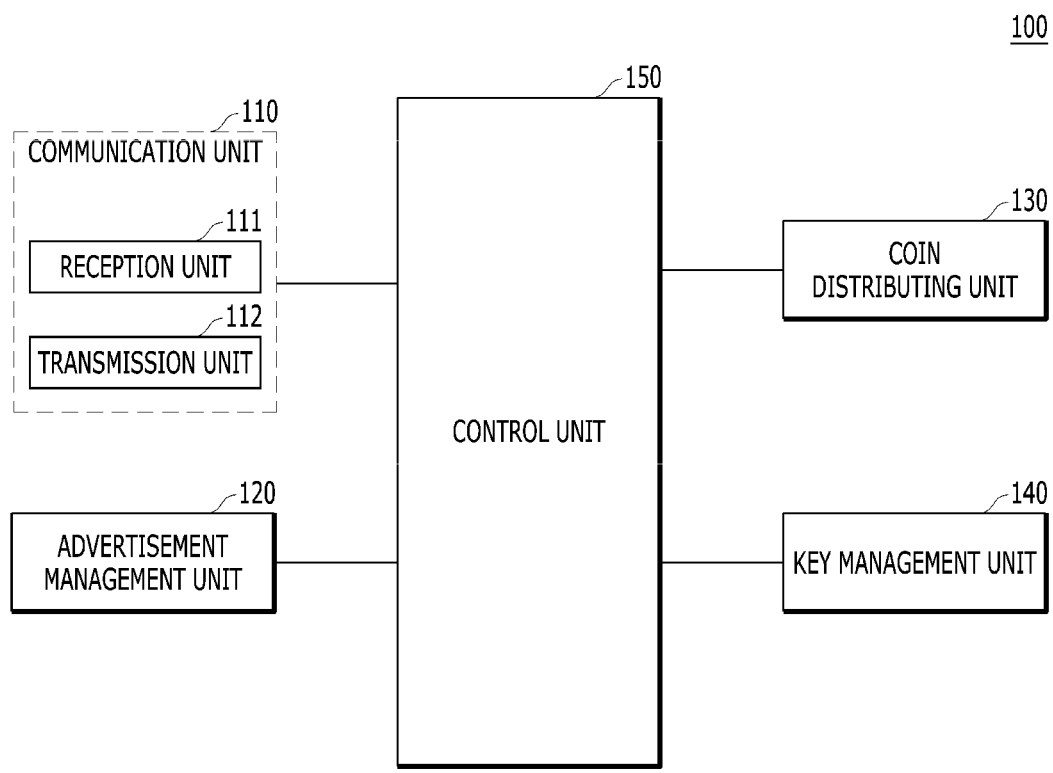
FIG. 2 is a block diagram illustrating an advertisement market server according to several exemplary embodiments.

FIG. 2 is a block diagram illustrating the advertisement market server according to several exemplary embodiments.

Referring to FIG. 2, the advertisement market server 100 may include a communication unit 110, an advertisement management unit 120, a coin distributing unit 130, a key managing unit 140, and a control unit 150. However, the constituent elements are not essential for implementing the advertisement market server 100, so that the advertisement market server 100 may have constituent elements more or less than the listed constituent elements. Herein, each of the constituent elements may be formed of a separate chip, module, or device, and may also be included in one device.

The communication unit 110 may include one or more modules which are capable of establishing communication between the advertisement market server 100 and a communication system, between the advertisement market server 100 and the advertiser device 200, between the advertisement market server 100 and the advertisement agency 300, or between the advertisement market server 100 and the advertisement exposure target 400. Further, the communication unit 110 may include one or more modules connecting the advertisement market server 100 to one or more networks.

The communication unit 110 may include at least one of a mobile communication module, a wireless Internet module, and a LAN.

The communication unit 110 may include a reception unit 111 and a transmission unit 112. However, the present disclosure is not limited thereto, and the communication unit 110 may also transceive data through one module.

The reception unit 111 may receive the first information about the advertisement transaction request from the advertiser device, the second information about the reward payment condition, and the sealed first coin.

The control unit 150 may generate a beginning transaction according to the reception of the first information, the second information, and the sealed first coin.

The control unit 150 may transmit the beginning transaction to the plurality of nodes by controlling the transmission unit 112 of the communication unit 110, thereby verifying the beginning transaction through a consensus algorithm. When the beginning transaction is verified, each of the plurality of nodes may generate a beginning block. In this case, the beginning transaction may be recorded in the beginning block.

The transaction may include information about transaction details between the nodes, information about the number of current coins of a transaction node, and the like. For example, the beginning transaction may include information about transaction details between the advertisement market server 100 and the advertiser device 200, information about the number of current coins of the advertisement market server 100, and information about the number of current coins of the advertiser device 200.

According to the exemplary embodiment of the present disclosure, the block is a block utilized in the block chain technology, and may be recorded with all of the contents (for example, transaction details and the number of currently possessed coins) related to information about the advertiser device 200, information about the advertisement market server 100, information about the advertisement agency 300, and information about the advertisement exposure target 400 as the transaction. The block will be described in more detail with reference to FIG. 11.

The beginning block may also be a genesis block, and may also be a block first generated between the advertiser device 200 and the advertisement market server 100.

When the beginning block is the genesis block, information about a first hash value of a previous block may not exist in the beginning block. The genesis block is the first generated block, so that there is no previous block.

When the beginning block is the block simply first generated between the advertiser device 200 and the advertisement market server 100, and when the beginning block is not the genesis block, the beginning block may include a hash value of a previous block generated by another advertiser device.

When advertisement selection information is received from the advertisement agency and the advertisement selection information corresponds to the first information, the advertisement management unit 120 may generate an advertisement page based on the first information. Further, the advertisement management unit 120 may cause the advertisement page to be transmitted to the advertisement agency and be exposed through the advertisement agency.

Particularly, the advertisement market server 100 may provide a platform for collecting the advertisement agency 300 to the advertisement agency 300 according to the reception of the first information, the second information, and the first coin from the advertiser device 200. When a specific advertisement is selected among the advertisements provided to the platform, the advertisement agency 300 may transmit advertisement selection information corresponding to the specific advertisement to the advertisement market server 100. The control unit 150 of the advertisement market server 100 may select an advertisement transaction request of the advertiser device 200 among the advertisement transaction requests included in the platform based on the advertisement selection information transmitted by the advertisement agency 300. That is, the advertisement selection information may include information about the advertisement which is selected by the advertisement agency 300 based on the reward payment condition and the advertisement cost.

The coin distributing unit 130 may receive an application signal from the advertisement exposure target through the advertisement page. Further, when the coin distributing unit 130 receives the application signal, the coin distributing unit 130 may generate the sealed second coin and the sealed third coin within the number of coins possessed by the advertisement market server 100 based on the second information. Further, the coin distributing unit 130 may determine to transmit the sealed second coin to the advertisement agency and transmit the sealed third coin to the advertisement exposure target. That is, the sealed first coin transmitted by the advertiser device 200 to the advertisement market server 100 may be a separate coin from the sealed second coin and the sealed third coin.

According to other several exemplary embodiments, when the coin distributing unit 130 receives the application signal, the coin distributing unit 130 may divide the first coin into the sealed second coin and the sealed third coin based on the second information. Further, the coin distributing unit 130 may determine to transmit the sealed second coin to the advertisement agency and transmit the sealed third coin to the advertisement exposure target.

When the coin distributing unit 130 distributes the coin, the coin distributing unit 130 may also determine whether to transfer ownership. This will be described in detail below.

The control unit 150 generally controls a general operation of the advertisement market server 100, in addition to an operation related to the advertisement mediation based on the block chain. The control unit 150 may provide a user with appropriate information or function or process appropriate information or function by processing a signal, data, information, and the like input or output through the constituent elements or driving an application program stored in a memory (not illustrated).

In order to drive the application program stored in the memory, the control unit 150 may control at least a part of the constituent elements described with reference to FIG. 2. Further, in order to drive the application program, the control unit 150 may combine and operate at least two or more of the constituent elements included in the advertisement market server 100.

The control unit 150 may generate a first transaction according to the transmission of the sealed second coin and the sealed third coin. Further, the control unit 150 may cause each of the plurality of nodes to verify the first transaction through the consensus algorithm by controlling the transmission unit 112 so as to transmit the first transaction to the plurality of nodes. When the first transaction is verified, each of the plurality of nodes may generate a first block. Herein, the first transaction may be recorded in a first block. In this case, each of the plurality of nodes may record the first transaction in the first block.

The key management unit 140 may control the transmission unit 112 so as to transmit a first key corresponding to the sealed second coin to the advertisement agency when the reward payment condition is satisfied. Further, when the reward payment condition is satisfied, the key management unit 140 may determine to transmit a second key corresponding to the sealed third coin to the advertisement exposure target. Herein, the first key and the second key may also be the sort of signals converting the sealed second coin and the sealed third coin to usable coins. Further, when the reward payment condition is satisfied, the key management unit 140 may control the transmission unit 112 so as to transmit the first key and the second key, and control the transmission unit 112 so as to transmit the ownerships of the coins corresponding to the first key and the second key at the same time. In this case, since the advertisement market server 100 has the ownerships of the sealed second coin and the sealed third coin before the key management unit 140 of the advertisement market server 100 transmits the first key and the second key, the advertisement market server 100 may obtain an interest for the sealed second coin and the sealed third coin. However, when the key management unit 140 of the advertisement market server 100 transmits the first key and the second key and the ownerships of the sealed second coin and the sealed third coin are transferred to the advertisement agency 300 and the advertisement exposure target 400, respectively, the advertisement agency 300 may obtain an interest for the second coin and the advertisement exposure target 400 may obtain an interest for the third coin.

In the meantime, the control unit 150 may generate a second transaction according to the transmission of the first key and the second key. Further, the control unit 150 may cause each of the plurality of nodes to verify the second transaction through the consensus algorithm by controlling the transmission unit 112 to transmit the second transaction to the plurality of nodes. When the second transaction is verified, each of the plurality of nodes may generate a second block. In this case, each of the plurality of nodes may record the second transaction in the second block.

The control unit 150 may control the transmission unit 112 so as to transmit a settlement request signal to the advertiser device. For example, when a predetermined time elapses, the control unit 150 may control the transmission unit 112 so as to transmit the settlement request signal to the advertiser device. For another example, when the specific condition is satisfied, the control unit 150 may control the transmission unit 112 so as to transmit the settlement request signal to the advertiser device.

The reception unit 111 may receive the third key corresponding to the first coin. Herein, the third key is a key which unseals the sealed first coin received by the advertisement market server 100 to the advertiser device 200 and converts the first coin to a usable coin.

According to the reception of the third key, the control unit 150 may generate a third transaction. Further, the control unit 150 may cause each of the plurality of nodes to verify the third transaction through the consensus algorithm by controlling the transmission unit 112 to transmit the third transaction to the plurality of nodes. When the third transaction is verified, each of the plurality of nodes may generate a third block. In this case, each of the plurality of nodes may record the third transaction in the third block.

Figure 3:
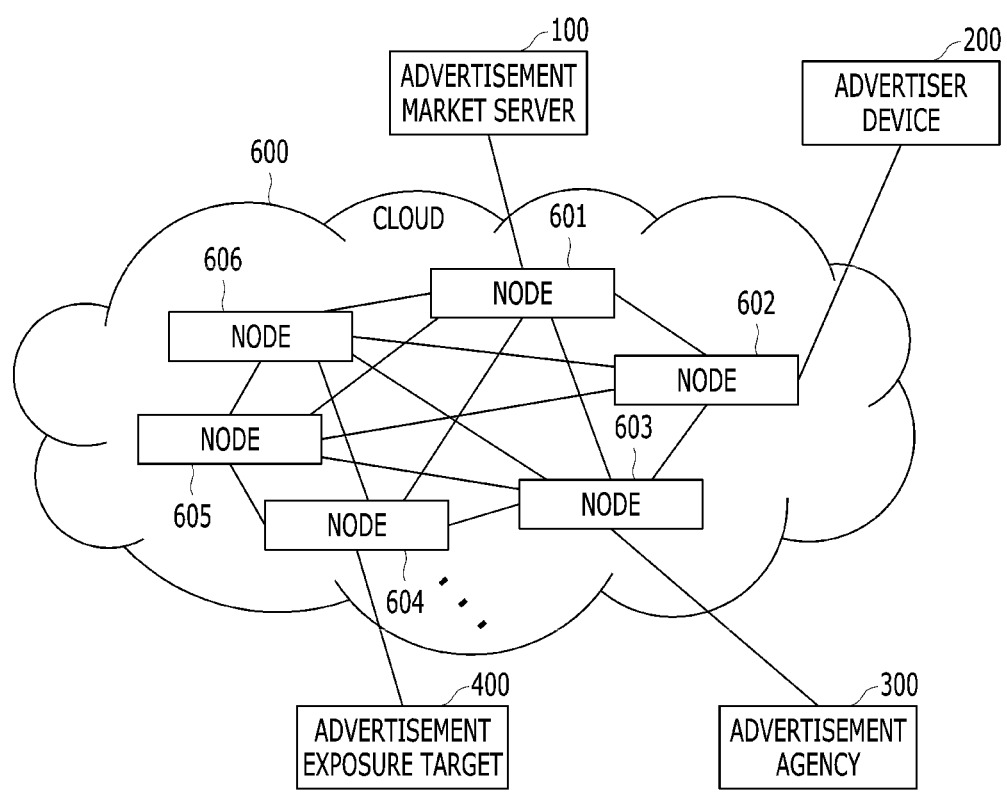
FIG. 3 is a diagram for describing a cloud according to several exemplary embodiments.

FIG. 3 is a diagram for describing the cloud according to several exemplary embodiments.

According to several exemplary embodiments of the present disclosure, the cloud 600 may include a plurality of nodes 601 to 606. According to several exemplary embodiments of the present disclosure, the plurality of nodes 601 to 606 may be connected with each other like the block chain system and may share and store a transaction including an advertisement, coins, and information related to the key.

The plurality of nodes included in the cloud 600 included in the cloud may include a full block chain node and a lightweight node.

The full block chain node may include information of all of the blocks from the beginning block of the block chain to a currently newly generated block. Further, the full block chain node may serve to collect and store all block chain information, and verify a block received for adding a new block.

The lightweight node does not have original information of all of the block information, but may include only header information. In order for the lightweight node to check the transaction, the lightweight node may perform simple payment verification.

For example, the lightweight node may request for block information from the full block chain node, and confirm certification contents of the transaction through a Merkle root.

However, for convenience of the description, it is assumed that the plurality of nodes 601 to 606 included in the cloud 600 is the full block chain node.

Each of the advertisement market server 100, the advertiser device 200, the advertisement agency 300, and the advertisement exposure target 400 according to the exemplary embodiments of the present disclosure may correspond to any one of the plurality of nodes 601 to 606.

According to the exemplary embodiments of the present disclosure, the advertisement market server 100 may also be any one node (for example, the node 601) of the plurality of nodes, and the advertisement market server 100 and the node may be separate configurations and communicate with each other.

The advertiser device 200 may also be any one node (for example, the node 602) among the plurality of nodes, and the advertiser device 200 and the node may be separate configurations and communicate with each other.

The advertisement agency 300 may also be any one node (for example, the node 603) among the plurality of nodes, and the advertisement agency 300 and the node may be separate configurations and communicate with each other.

The advertisement exposure target 400 may also be any one node (for example, the node 604) among the plurality of nodes, and the advertisement exposure target 400 and the node may be separate configurations and communicate with each other.

The same blocks may be distributed and stored in the plurality of nodes 601 to 606 included in the cloud 600. The distributed and stored block may include the transaction including information related to the advertisement, the coin, and the key.

The plurality of nodes 601 to 606 may include the same blocks (for example, the first block, the second block, and the third block).

Each of the plurality of nodes 601 to 606 may share the generated transaction, and record the transaction verified through the consensus algorithm in the block.

For example, when consent of the first transaction is completed through the consensus algorithm (when a verification of validity of the first transaction is completed), the first transaction may be distributed and stored in the first block of the plurality of nodes 601 to 606. After the first block is generated, the second transaction (the second transaction of which validity is completely verified) of which consent is completed through the consensus algorithm may be distributed and stored in the second block of the plurality of nodes 601 to 606. Information on a hash value of the first block may be included in the second block. Accordingly, the first block and the second block may be considered to be connected through a chain. That is, the first block and the second block may form a block chain. According to the foregoing contents, there is an effect in that data of the block chain structure cannot be forged.

According to several exemplary embodiments, as the consensus algorithm used in the present disclosure, a Proof of Work (POW) algorithm, a proof of stake algorithm, a Practical Byzantine Fault Tolerant (PBFT) algorithm, a sieve algorithm, and the like may also be used.

As described above, the advertisement mediating method based on the block chain records information about coin transaction details, the number of current coins, and the like in the block by using the consensus algorithm of the block chain technology, so that there is an effect in that it is possible to prevent coin transaction details and the number of current coins from being forged or falsified.

In the meantime, the consensus algorithm according to several exemplary embodiments of the present invention may be a public type or a private type. In the case of the public-type consensus algorithm, the verification operation needs to be performed on all of the nodes in order to verify the transaction, which is very inefficient, so that it is appropriate to use the private-type consensus algorithm. However, the present disclosure is not limited thereto, and the public-type consensus algorithm may also be used as the consensus algorithm.

Figure 4:
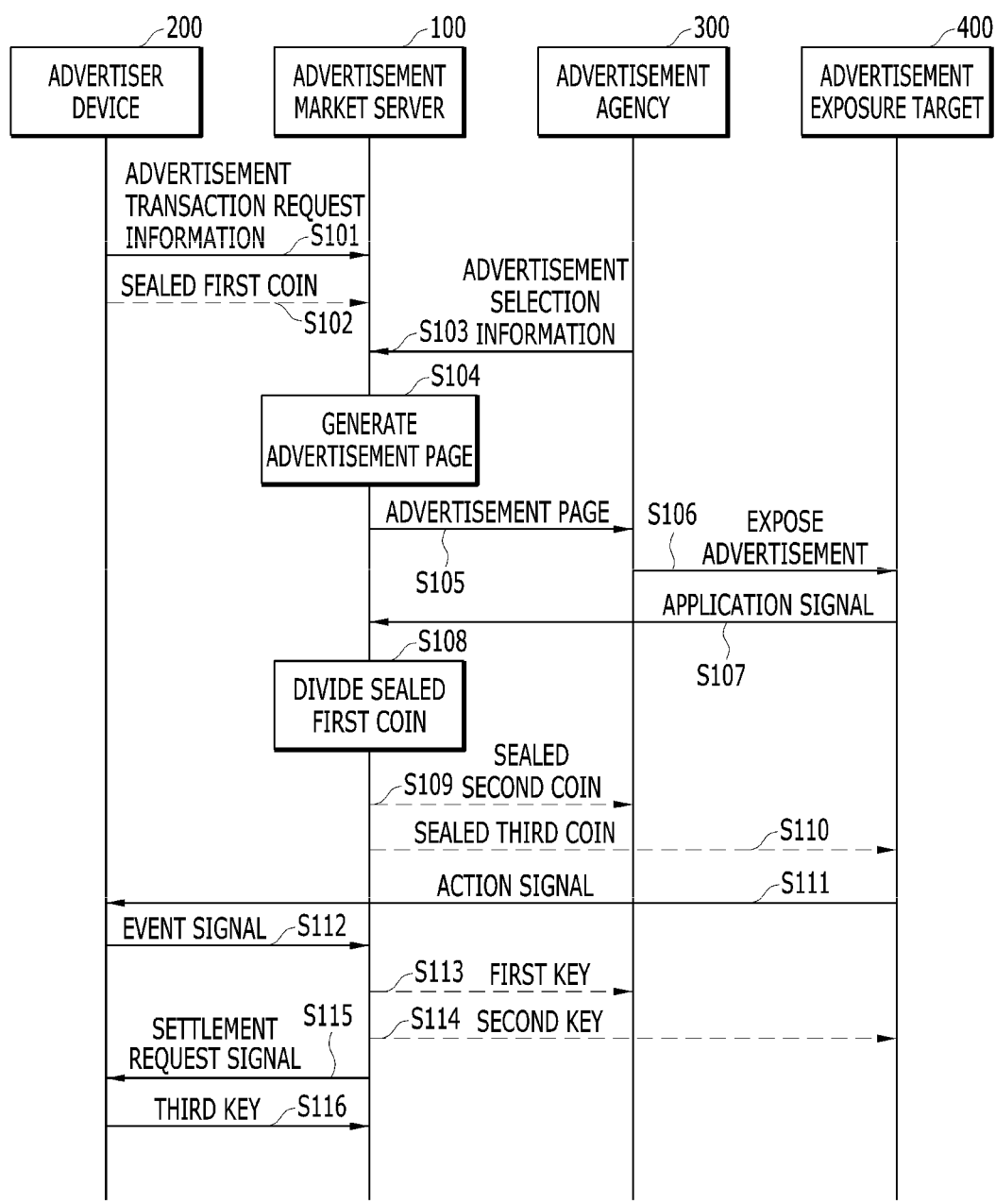
FIG. 4 is a flowchart for describing an example of an advertisement mediating method based on a block chain according to several exemplary embodiments.
Figure 5:
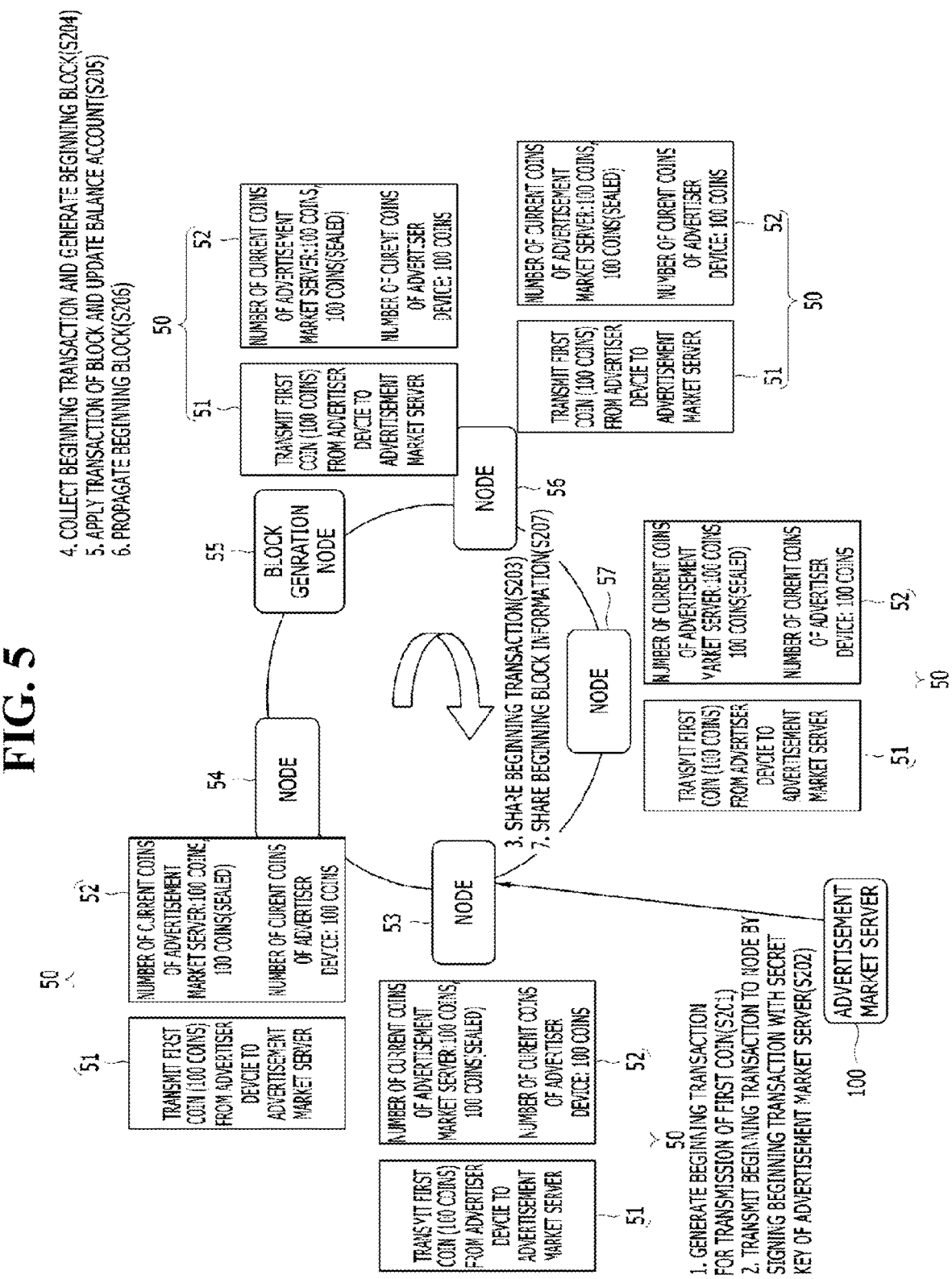
FIG. 5 is a diagram for describing an example of generating a beginning block by an advertisement mediating system according to several exemplary embodiments.
Figure 6:
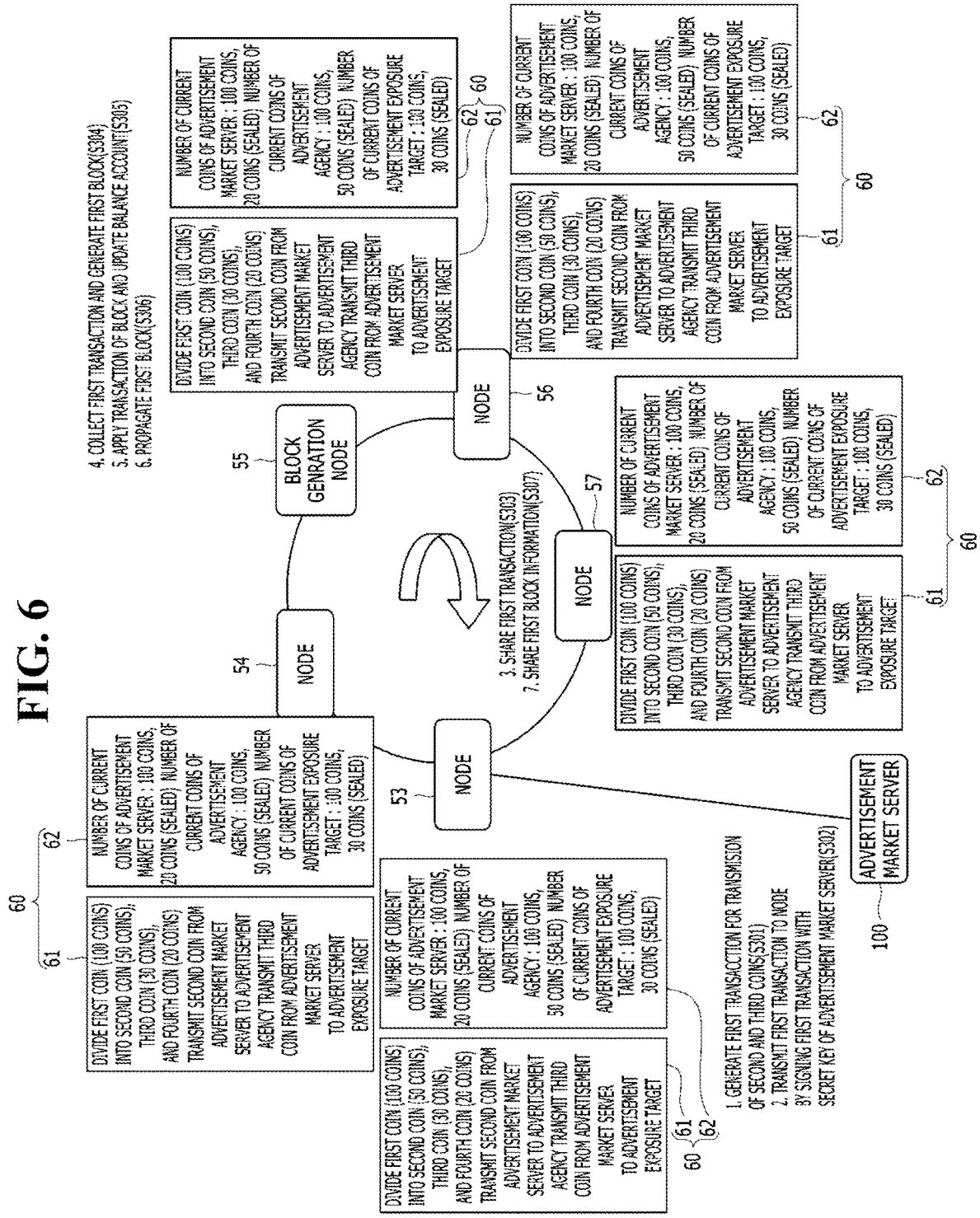
FIG. 6 is a diagram for describing an example of generating a first block by the advertisement mediating system according to several exemplary embodiments.
Figure 7:
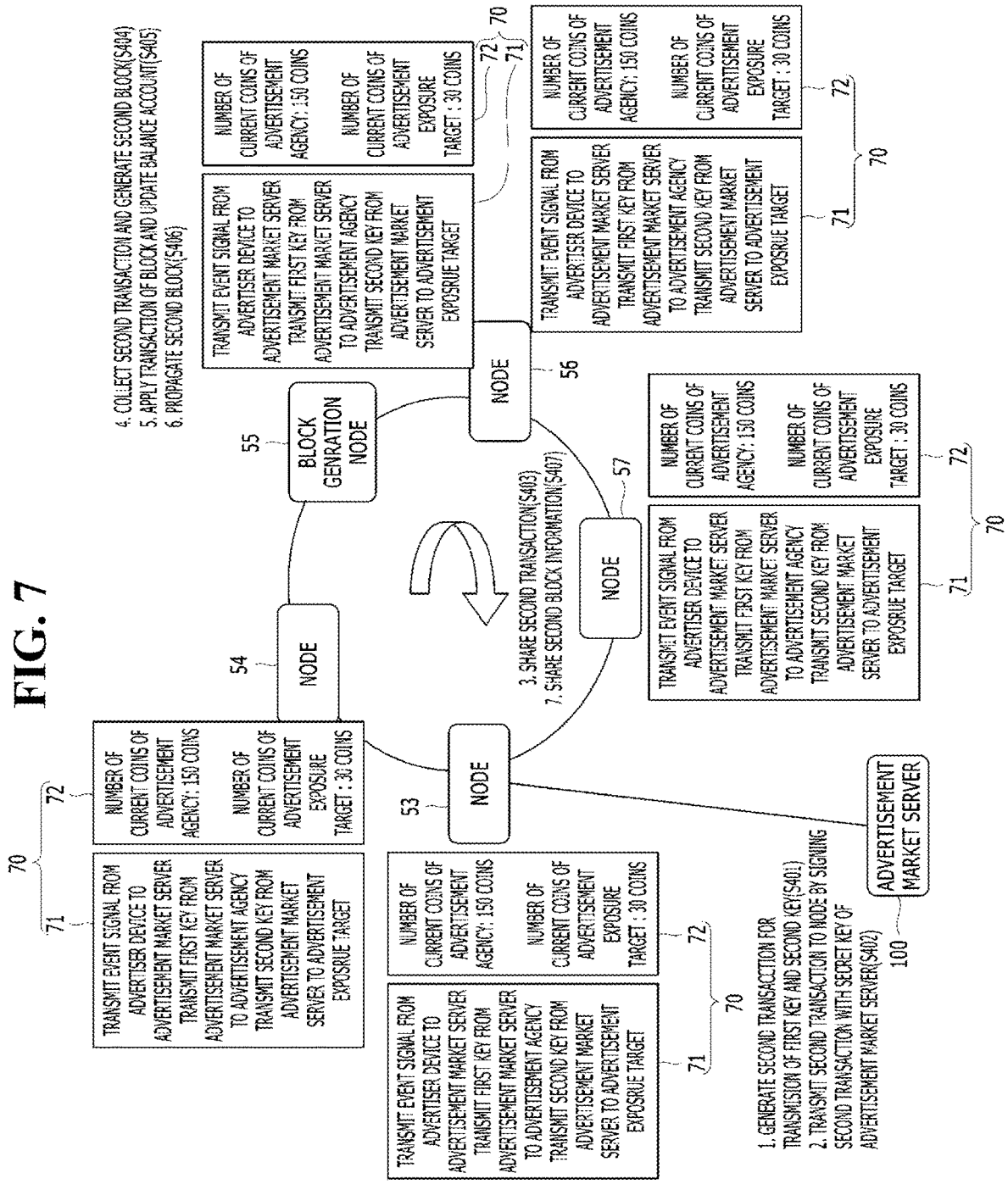
FIG. 7 is a diagram for describing an example of generating a second block by the advertisement mediating system according to several exemplary embodiments.
Figure 8:
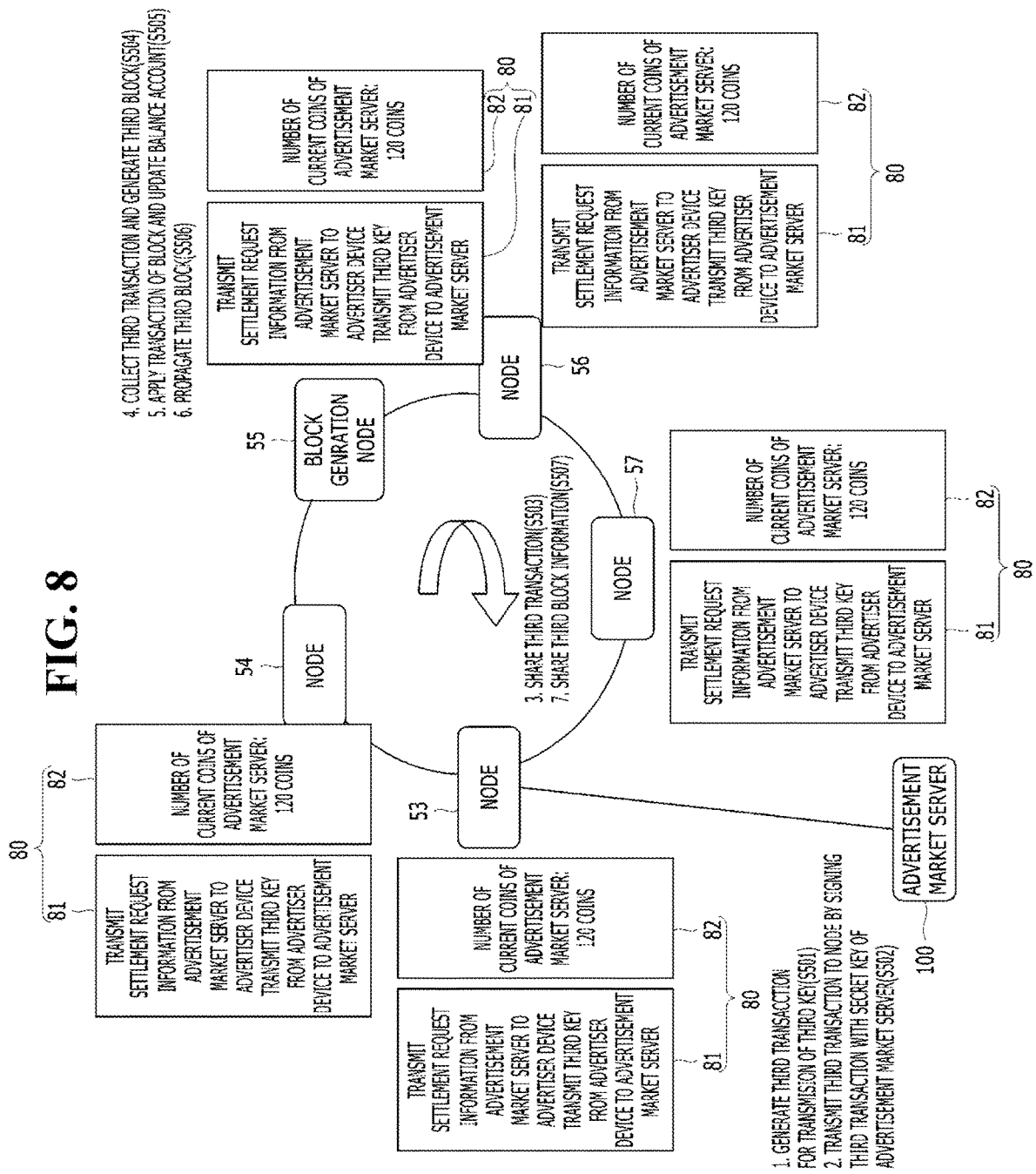
FIG. 8 is a diagram for describing an example of generating a third block by the advertisement mediating system according to several exemplary embodiments.

FIG. 4 is a flowchart for describing an example of the advertisement mediating method based on the block chain according to several exemplary embodiments. FIG. 5 is a diagram for describing an example of generating a beginning block by the advertisement mediating system according to several exemplary embodiments. FIG. 6 is a diagram for describing an example of generating a first block by the advertisement mediating system according to several exemplary embodiments. FIG. 7 is a diagram for describing an example of generating a second block by the advertisement mediating system according to several exemplary embodiments. FIG. 8 is a diagram for describing an example of generating a third block by the advertisement mediating system according to several exemplary embodiments.

In relation to FIGS. 4 to 8, the advertisement mediating method may be implemented in a Decentralized Application (DApp). Further, in the advertisement mediating method, a program may be coded with a solidity language. However, the present disclosure is not limited thereto, and in the advertisement mediating method, a program may also be coded through a common programming language (C language and JAVA language).

Referring to FIG. 4, the advertiser device 200 may transmit advertisement transaction request information to the advertisement market server 100 (S101). Further, the advertiser device 200 may transmit a sealed first coin to the advertisement market server 100 (S102). In this case, the advertiser device 200 may transmit ownership for the sealed first coin to the advertisement market server 100 together. In this case, the advertisement market server 100 may obtain an interest for the sealed first coin. For example, the advertisement market server 100 may obtain 0.5% of the first coin as an interest for the first coin once per week.

That is, the advertisement market server 100 may secure operation funds of an advertisement market through the interest of the sealed first coin received from the advertiser device 200.

The orders of operations S101 and S102 may be changed. That is, the advertiser device 200 may transmit the sealed first coin to the advertisement market server 100 (S102), and the advertiser device 200 may transmit the advertisement transaction request information to the advertisement market server 100. In the meantime, operations S101 and S102 may also be performed at the same time.

The advertisement transaction request information (first information) may include advertisement cost information, information about advertisement contents, and an advertisement contract request document. However, the present disclosure is not limited thereto.

The information about the contents may include an advertisement field (for example, a company advertisement, a product advertisement, and a campaign) desired to be advertised by an advertiser, information (for example, company information, product information, and campaign information) about an item desired to be advertised, a target (for example, university students, people in 30's, and people in 40's) of an item desired to be advertised, and the like.

The advertisement cost information may include information about a coin paid to an advertisement agency and information about a coin paid to an advertisement exposure target. For example, when the advertisement exposure target 400 satisfies a reward payment condition, the advertisement cost information may include information indicating that 100 coins (the second coin) are paid to the advertisement agency 300 and 300 coins (the third coin) are paid to the advertisement exposure target.

The sealed first coin may be advertisement cost which the advertiser pays to an advertisement market server. Information about the amount of coins included in the first coin may be calculated by multiplying the number of customers (or the number of users which are to receive the first coin) by a customer transaction. For example, the first coin may be calculated by multiplying the number of advertisement exposure targets 400 and the number of advertisement agencies 300 by a customer transaction (a sum of total coins calculated based on information about the amount of coins (second coins) paid to the advertisement exposure target and information about the amount of coins (third coins) paid to the advertisement agency 300).

Herein, the transmission of the sealed first coin may mean the transmission of a record (or the transaction) indicating that the advertiser device 200 transmits the determined number of sealed coins to the advertisement market server 100 as the advertisement cost.

When a beginning transaction including the contents that the advertiser device 200 transmits the sealed first coin to the advertisement market server 100 is generated, the beginning transaction may be verified through the consensus algorithm in the plurality of nodes. That is, the control unit 150 of the advertisement market server 100 transmits the beginning transaction to the plurality of nodes by controlling the transmission unit 112 to cause validity of the beginning transaction to be verified in the plurality of nodes through the consensus algorithm.

The method of verifying the beginning transaction including the contents that the advertiser device 200 transmits the sealed first coin to the advertisement market server 100 in the plurality of nodes through the consensus algorithm will be described with reference to FIG. 5 below.

Referring to FIG. 5, when the control unit 150 of the advertisement market server 100 receives the first coin from the advertiser device 200, the control unit 150 may generate the beginning transaction 50 indicating that the advertiser device 200 transmits the first coin to the advertiser market server 100 (S201).

The beginning transaction 50 may include information 51 about coin transmission details and coin possession state information 52 indicating newest information about a current coin possession state.

For example, the information 51 about coin transmission details may include information about transaction details, such as "the transmission of the first coin (100 coins) from the advertiser device to the advertisement market server". Further, the information 51 about coin transmission details may also include information about transaction details (the transfer of the ownership of the coin), such as "the transfer of the ownership of the first coin (100 coins) from the advertiser device to the advertisement market server". Further, the coin possession state information 52 may include information about the number of current coins possessed by main agents transacting coins and information about the sealed coin, such as "information indicating that the number of current coins of the advertisement market server is 100 coins and information indicating that 100 coins are sealed", and "information indicating that the number of current coins of the advertiser device is 100 coins".

Herein, the information indicating that the number of current coins of the advertisement market server 100 is 100 coins may be the information indicating that the number of existing coins possessed by the advertisement market server 100 is 100 coins, and the information indicating that 100 coins are sealed may mean that the advertisement market server 100 possesses sealed 100 coins separate from the existing coins.

Since the beginning transaction 50 includes the coin possession state information 52, there is an effect in that the plurality of nodes may solve a double payment problem without checking a previous block.

According to several exemplary embodiments, information about an entity may be anonymously stored in the information 51 about coin transmission details and the current coin possession state information 52. For example, when the contents that the advertisement market server transmits the first coin to the advertisement agency in the information 51 about coin transmission details is recorded in the beginning transaction, only information about a public key of the advertisement market server, information about the first coin, and information about a public key of the advertiser device may be recorded in the beginning transaction. In the foregoing example, only the information 51 about coin transmission details is described with the example, but the present disclosure is not limited thereto, and information about the entity in all of the information 51 about coin transmission details and the current coin possession state information 52 may be recorded as a public key of each entity. Accordingly, there is an effect in that personal information of the entities in the advertisement mediating system is protectable.

According to several exemplary embodiments, the control unit 150 of the advertisement market server 100 may control the transmission unit 112 so as to transmit the beginning transaction 50 to the plurality of nodes by signing the beginning transaction 50 with a secret key of the advertisement market server 100 (S202). Particularly, the control unit 150 of the advertisement market server 100 may control the transmission unit 112 so as to encrypt the beginning transaction 50 with a private key through the public key encryption algorithm and transmit the encrypted beginning transaction 50 to the node 53, and the node 53 may share the encrypted transaction with the plurality of nodes (S203). The plurality of nodes may decrypt the encrypted transaction with a public key of the advertisement market server 100. Since the plurality of nodes decrypts the encrypted transaction only with the public key of the advertisement market server 100, the plurality of nodes may recognize that the advertisement market server 100 encrypts and transmits the beginning transaction 50.

When the transaction is shared in operation S203, the plurality of nodes 53 to 57 included in the cloud 600 may have stored the information 51 about the coin transmission details and the coin possession state information 52 included in the shared transaction.

The block generation node 55 may collect the beginning transaction 50 shared in operation S203 and generate the beginning block (S204). Herein, the block generation node 55 may generate a block through at least one of a POW algorithm, a proof of stake algorithm, a PBFT algorithm, and a sieve algorithm. However, the present disclosure is not limited thereto, the block generation node 55 may also generate a block through a consensus algorithm different from the foregoing consensus algorithms (S204). Herein, any one node among all of the nodes included in the cloud 600 may be the block generation node 55, and a specific node does not become the block generation node. That is, a node which first finds a nonce value through the consensus algorithm among the plurality of nodes may become the block generation node.

In the meantime, the block generation node 55 may update a balance account of the transacting nodes by applying the beginning transaction 50 to the beginning block (S205). Herein, the balance account may be the coin possession state information 52.

The block generation node 55 may propagate the beginning block of which the balance account is updated to the plurality of nodes 53 to 57 (S206).

The plurality of nodes 53 to 57 may share information about the beginning block propagated by the block generation node 55 (S207). The plurality of nodes 53 to 57 may verify validity of the beginning transaction through the consensus algorithm by sharing the information about the beginning block.

Particularly, the plurality of nodes 53 to 57 may recognize whether information included in a previous block is forged/falsified based on whether information on a hash value of the previous block included in the information about the beginning block is the same as information about a hash value of the previous block recorded in each of the plurality of nodes 53 to 57. Further, the plurality of nodes 53 to 57 may check whether information about the hash value of the beginning block is calculated by using information about a nonce value included in the information about the beginning block and verify validity of the transaction. When the validity of the transaction is verified by the foregoing method, there is an effect in that it is actually impossible to forge/falsify the transaction and the operation of verifying validity of the transaction is simple.

The information about the nonce value may be a predetermined value used when a hash value of the beginning block is generated through a hash algorithm (for example, Secure Hash Algorithm-256 (SHA-256)). The block generation node 55 may search for a nonce value which outputs a hash value smaller than a difficulty value included in a header of the beginning block while randomly changing the nonce value.

The information about the hash value of the beginning block may be a value obtained by transforming the nonce value and the information included in the header of the beginning block to the hash value through the hash algorithm. Herein, the hash value may be a value smaller than the difficulty value included in the header of the beginning block.

The method of verifying validity of the transaction is a method used in the consensus algorithm, such as the POW algorithm, the proof of stake algorithm, the PBFT algorithm, and the sieve algorithm, of which the detailed description will be omitted.

When the validity of the beginning transaction is verified in the plurality of nodes 53 to 57, each of the plurality of nodes (all of the nodes included in the cloud except for the block generation node) may generate a beginning block, and record the beginning transaction in the beginning block. In this case, all of the nodes included in the cloud share information about the beginning block, so that the same beginning transaction may be recorded in the block. Accordingly, there is an effect in that it is actually impossible to forge/falsify the beginning transaction.

According to several exemplary embodiments, when each of the plurality of nodes 53 to 57 generates the beginning block, each of the plurality of nodes 53 to 57 may also update the balance account of the beginning block generated by each node by using the beginning transaction 50 of the shared information about the beginning block.

Referring back to FIG. 4, the advertisement agency 300 may transmit advertisement selection information to the advertisement market server 100 (S103).

The advertisement selection information may be information about an advertisement selected based on a reward payment condition and advertisement cost by the advertisement agency 300 as described in detail with reference to FIG. 2.

The control unit 150 of the advertisement market server 100 may generate an advertisement page based on the advertisement selection information according to the reception of the advertisement selection information from the advertisement agency 300 (S104).

According to several exemplary embodiments, the advertiser device 200 may generate the advertisement page and transmit the generated advertisement page to the advertisement market server 100.

Particularly, the control unit 150 of the advertisement market server 100 may store first information received from the advertiser device 200. In this case, the control unit 150 of the advertisement market server 100 may generate the advertisement page based on the first information when receiving advertisement selection information corresponding to the first information through the reception unit 111.

According to several exemplary embodiments, the control unit 150 of the advertisement market server 100 may control the advertisement management unit 120 so as to generate the advertisement page based on the information about the advertisement agency 300.

For example, when the advertisement agency 300 is a blogger, the advertisement management unit 120 of the advertisement market server 100 may also correct the advertisement page to a web page having the predetermined number of pages.

For another example, when the advertisement agency 300 is an account of an SNS, the advertisement management unit 120 of the advertisement market server 100 may also correct the advertisement page to a page having the form which may be posted in an SNS platform of the advertisement agency 300.

The advertisement management unit 120 of the advertisement market server 100 may control the transmission unit 112 so as to transmit the generated advertisement page to the advertisement agency 300 (S105). Further, the advertisement agency 300 may expose the advertisement page to the advertisement exposure target 400 (S106).

The advertisement exposure target 400 may check the advertisement exposed in operation S106 and apply to a specific advertisement. When the advertisement exposure target 400 applies to the specific advertisement, the advertisement exposure target 400 may transmit an application signal to the advertisement market server 100.

For example, in the case where a reward is paid when the advertisement exposure target 400 installs a specific application, the application signal may be an access signal indicating that the advertisement exposure target 400 accesses a web site for installing the specific application through the exposed advertisement. That is, when the advertisement exposure target 400 accesses the web site and transmits the access signal to the advertisement market server 100, the control unit 150 of the advertisement market server 100 may recognize the received access signal as the application signal.

For another example, in the case where a reward is paid when the advertisement exposure target 400 achieves a predetermined level in a specific game application, the application signal may be an installation signal indicating that the advertisement exposure target 400 installs the specific game application through the advertisement exposed to the advertisement exposure target 400. That is, when the advertisement exposure target 400 installs the specific application and transmits the installation signal to the advertisement market server 100, the control unit 150 of the advertisement market server 100 may recognize the received installation signal as the application signal.

For another example, in the case where a reward is paid when the advertisement exposure target 400 watches an advertisement video, the application signal may be a signal indicating that the advertisement exposure target 400 touches and inputs an indicator related to the watch of the specific advertisement video in a specific application through the advertisement exposed to the advertisement exposure target 400.

However, the examples are the simple descriptions of an example of the application signal, and various signals may be the application signals. Information about the application signal may be included in the advertisement transaction request information received by the advertisement market server 100 in operation S101.

According to several exemplary embodiments, when the coin distributing unit 130 of the advertisement market server 100 receives the application signal in operation S107, the coin distributing unit 130 of the advertisement market server 100 may transmit a sealed second coin and a sealed third coin separate from the sealed first coin to the advertisement agency 300 and the advertisement exposure target 400, respectively, within the number of coins possessed by the advertisement market server 100. In this case, even though the advertisement market server 100 transmits the sealed second coin and the sealed third coin to another terminal (the advertisement agency and the advertisement exposure target), the advertisement market server 100 may have the ownerships of the sealed second coin and the sealed third coin.

Herein the ownerships of the sealed second coin and the sealed third coin may be provided at the same time when a key corresponding to the sealed coin is provided.

According to several other exemplary embodiments, when the coin distributing unit 130 of the advertisement market server 100 receives the application signal in operation S107, the coin distributing unit 130 of the advertisement market server 100 may divide the sealed first coin into the plurality of sealed coins (for example, the sealed second coin, the sealed third coin, and the sealed fourth coin) (S108).

Particularly, the advertisement transaction request information received in operation S101 may include information related to the division of the coin. Accordingly, when the coin distributing unit 130 receives the application signal, the coin distributing unit 130 may recognize the amount of coins to be provided to the advertisement agency 300 and the amount of coins to be provided to the advertisement exposure target 400 by using the information related to the division of the coin included in the advertisement transaction request information. Further, the coin distributing unit 130 may divide the sealed first coin into the sealed second coin and the sealed third coin based on the amount of coins to be provided to each of the advertisement agency 300 and the advertisement exposure target 400.

The coin distributing unit 130 of the advertisement market server 100 may control the transmission unit 112 so as to transmit at least one (for example, the sealed second coin) among the plurality of divided coins to the advertisement agency 300. Further, the coin distributing unit 130 of the advertisement market server 100 may control the transmission unit 112 so as to transmit at least one (for example, the sealed third coin) among the plurality of divided coins to the advertisement exposure target 400.

As described above, when the advertisement market server 100 transmits the sealed second coin and the sealed third coin to the advertisement agency 300 and the advertisement exposure target 400, respectively, within the number of possessed coins, operation S108 related to the division of the first coin may be omitted.

The sealed coin may mean the coin which has a value (for example, 100 coins) of the sealed coin, but is sealed in a state where a demander cannot directly use the coin. For example, 100 sealed coins received from the advertiser device 200 by the advertisement market server 100 cannot be used until the coins are unsealed with a key corresponding to the sealed coin. Herein, "the sealed coin cannot be used" may mean that the sealed coin cannot be utilized as the coin which is capable of generating another transaction.

Herein, the transmission of the sealed second coin and the sealed third coin may mean the transmission of the record (or the transaction) indicating that the advertisement market server 100 transmits the sealed coins to the advertisement agency 300 and the advertisement exposure target 400.

When a first transaction including the contents that the advertisement market server 100 transmits the sealed second coin and the sealed third coin to the advertisement agency 300 and the advertisement exposure target 400, respectively, is generated, the first transaction may be verified in the plurality of nodes through the consensus algorithm. That is, the control unit 150 of the advertisement market server 100 transmits the first transaction to the plurality of nodes by controlling the transmission unit 112 to cause the first transaction to be verified in the plurality of nodes through the consensus algorithm.

The method of verifying the first transaction including the contents that the advertisement market server 100 transmits the sealed second coin and the sealed third coin to the advertisement agency 300 and the advertisement exposure target 400, respectively, in the plurality of nodes through the consensus algorithm will be described with reference to FIG. 6.

Referring to FIG. 6, when the control unit 150 of the advertisement market server 100 transmits the second coin and the third coin, the control unit 150 may generate a first transaction 60 indicating that the advertisement market server 100 transmits the sealed second coin to the advertisement agency 300 and the advertisement market server 100 transmits the sealed third coin to the advertisement exposure target 400 (S301).

The first transaction 60 may include information 61 about coin transmission details and coin possession state information 62 indicating the newest information about a current coin possession state.

For example, the information 61 about coin transmission details may include information about transaction details, such as "the division of the first coin into the second coin, "the third coin, and the fourth coin", the transmission of the second coin from the advertisement market server to the advertisement agency", and "the transmission of the third coin from the advertisement market server to the advertisement exposure target". Further, information 61 about coin transmission details may also include information about transaction details (the transfer of the ownership of the coin), such as "non-transfer of the ownership of the second coin and the third coin. Further, the coin possession state information 62 may include information about the number of current coins possessed by main agents transacting coins and information about the sealed coin, such as "information indicating that the number of current coins of the advertisement market server is 100 coins and information indicating that 20 coins are sealed", and "information indicating that the number of current coins of the advertiser agency is 100 coins and information indicating that 50 coins are sealed".

Herein, the information indicating that the number of current coins of the advertisement market server 100 is 100 coins and 20 coins are sealed means that the advertisement market server 100 possesses 100 unsealed coins and 20 sealed coins. Further, the information indicating that the number of current coins of the advertisement agency is 100 coins and 50 coins are sealed means that the advertisement agency possesses 100 unsealed coins and 50 sealed coins.

Since the first transaction 60 includes the coin possession state information 62, there is an effect in that the plurality of nodes may solve a double payment problem without checking a previous block.

According to several exemplary embodiments, information about an entity may be anonymously stored in the information 61 about coin transmission details and the coin possession state information 62. For example, when the contents that the advertisement market server transmits the second coin to the advertisement agency in the information 61 about coin transmission details is recorded in the first transaction, only information about a public key of the advertisement market server, information about the second coin, and information about a public key of the advertiser agency may be recorded in the first transaction. In the foregoing example, only a part of the information 61 about coin transmission details is described with the example, but the present disclosure is not limited thereto, and information about the entity in all of the information 61 about coin transmission details and the current coin possession state information 62 may be recorded as a public key of each entity. Accordingly, there is an effect in that personal information of the entities in the advertisement mediating system is protectable.

According to several exemplary embodiments, the control unit 150 of the advertisement market server 100 may control the transmission unit 112 so as to transmit the first transaction 60 to the plurality of nodes by signing the first transaction 60 with a secret key of the advertisement market server 100 (S302). Particularly, the control unit 150 of the advertisement market server 100 may control the transmission unit 112 so as to encrypt the first transaction 60 with a private key through the public key encryption algorithm and transmit the encrypted first transaction 60 to the node 53, and the node 53 may share the encrypted transaction with the plurality of nodes (S303). The plurality of nodes may decrypt the encrypted transaction with a public key of the advertisement market server 100. Since the plurality of nodes decrypts the encrypted transaction only with the public key of the advertisement market server 100, the plurality of nodes may recognize that the advertisement market server 100 encrypts and transmits the first transaction 60.

When the transaction is shared in operation S303, the plurality of nodes 53 to 57 included in the cloud 600 may have stored the information 61 about the coin transmission details and the coin possession state information 62 included in the shared transaction.

The block generation node 55 may collect the first transaction 60 shared in operation S303 and generate the first block (S304). Herein, the block generation node 55 may generate a block through at least one of a POW algorithm, a proof of stake algorithm, a PBFT algorithm, and a sieve algorithm. However, the present disclosure is not limited thereto, the block generation node 55 may also generate a block through a consensus algorithm different from the foregoing consensus algorithms (S304). Herein, any one node among all of the nodes included in the cloud 600 may be the block generation node 55, and a specific node does not become the block generation node. That is, a node which first finds a nonce value through the consensus algorithm among the plurality of nodes may become the block generation node.

In the meantime, the block generation node 55 may update a balance account of the transacting nodes by applying the first transaction 60 to the first block (S305). Herein, the balance account may be the coin possession state information 62.

The block generation node 55 may propagate the first block of which the balance account is updated to the plurality of nodes 53 to 57 (S306).

The plurality of nodes 53 to 57 may share information about the first block propagated by the block generation node 55 (S307). The plurality of nodes 53 to 57 may verify validity of the first transaction through the consensus algorithm by sharing the information about the first block.

Particularly, the plurality of nodes 53 to 57 may recognize whether information included in a previous block is forged/falsified based on whether information on a hash value of the previous block included in the information about the first block is the same as information about a hash value of the previous block recorded in each of the plurality of nodes 53 to 57. Further, the plurality of nodes 53 to 57 may check whether information about the hash value of the first block is calculated by using information about a nonce value included in the information about the first block and verify validity of the transaction. When the validity of the transaction is verified by the foregoing method, there is an effect in that it is actually impossible to forge/falsify the transaction and the operation of verifying validity of the transaction is simple.

The information about the nonce value may be a predetermined value used when a hash value of the first block is generated through a hash algorithm (for example, Secure Hash Algorithm-256 (SHA-256)). The block generation node 55 may search for a nonce value which outputs a hash value smaller than a difficulty value included in a header of the first block while randomly changing the nonce value.

The information about the hash value of the first block may be a value obtained by transforming the nonce value and the information included in the header of the first block to the hash value through the hash algorithm. Herein, the hash value may be a value smaller than the difficulty value included in the header of the first block.

The method of verifying validity of the transaction is a method used in the consensus algorithm, such as the POW algorithm, the proof of stake algorithm, the PBFT algorithm, and the sieve algorithm, of which the detailed description will be omitted.

When the validity of the first transaction is verified in the plurality of nodes 53 to 57, each of the plurality of nodes (all of the nodes included in the cloud except for the block generation node) may generate the first block, and record the first transaction in the first block. In this case, all of the nodes included in the cloud share information about the first block, so that the same first transaction may be recorded in the block. Accordingly, there is an effect in that it is actually impossible to forge/falsify the first transaction.

According to several exemplary embodiments, when each of the plurality of nodes 53 to 57 generates the first block, each of the plurality of nodes 53 to 57 may also update the balance account of the first block generated by each node by using the first transaction 60 of the shared information about the first block.

Referring back to FIG. 4, the advertisement exposure target 400 may transmit an action signal to the advertiser device 200 (S111).

Herein, the action signal may be a signal indicating that an action corresponding to the application signal is performed. Particularly, the action signal may be a signal indicating that the advertisement exposure target 400 satisfies the reward payment condition.

For example, in the case where a reward is paid when the advertisement exposure target 400 installs a specific application, the action signal may be a signal indicating that the advertisement exposure target 400 accesses a web site for installing the specific application and installs the specific application.

For another example, in the case where a reward is paid when the advertisement exposure target 400 achieves a predetermined level in a specific game application, the action signal may be a signal indicating that the advertisement exposure target 400 achieves the predetermined level in the specific game application.

For another example, in the case where a reward is paid when the advertisement exposure target 400 watches a specific advertisement video, the action signal may be a signal indicating that the advertisement exposure target 400 completes the watch of the advertisement in the specific application.

The advertiser device 200 may transmit an event signal to the advertisement market server 100 in response to the received action signal (S112). Herein, the event signal may be a signal directing the advertisement market server 100 to transmit the first key and the second key to the advertisement agency 300 and the advertisement exposure target 400, respectively.

When the key management unit 140 of the advertisement market server 100 receives the event signal, the key management unit 140 may control the transmission unit 112 so as to transmit a key which unseals the sealed coin and converts the unsealed coin to a usable coin to each of the advertisement agency 300 and the advertisement exposure target 400.

Particularly, the key management unit 140 of the advertisement market server 100 may control the transmission unit 112 so as to transmit the first key which is capable of unsealing the sealed second coin to the advertisement agency 300 (S113). In this case, the advertisement agency 300 may convert the sealed second coin to a usable coin to use the second coin.

The key management unit 140 of the advertisement market server 100 may control the transmission unit 112 so as to transmit the second key which is capable of unsealing the sealed third coin to the advertisement exposure target 400 (S114). In this case, the advertisement exposure target 400 may convert the sealed third coin to a usable coin to use the third coin.

Performance orders of operations S113 and S114 may be changed. That is, the key management unit 140 of the advertisement market server 100 may control the transmission unit 112 so as to transmit the second key which is capable of unsealing the sealed third coin to the advertisement exposure target 400 and transmit the first key which is capable of unsealing the sealed second coin to the advertisement agency 300. In the meantime, operations S113 and S114 may also be performed at the same time. Further, operations S112, S113, and S114 may also be performed at the same time.

In the meantime, according to several exemplary embodiments, the key management unit 140 of the advertisement market server 100 may encrypt the first key and the second key by using the public key encryption algorithm and transmit the encrypted first key and second key to the advertisement agency 300 and the advertisement exposure target 400.

Particularly, the reception unit 111 of the advertisement market server 100 may receive a first public key of the advertisement agency 300 and a second public key of the advertisement exposure target 400 from the advertisement agency 300 and the advertisement exposure target 400, respectively, before transmitting the first key and the second key. The key management unit 140 of the advertisement market server 100 may encrypt the first key with the first public key and transmit first data in which the first key is encrypted to the advertisement agency 300. Further, the key management unit 140 of the advertisement market server 100 may encrypt the second key with the second public key and transmit second data in which the second key is encrypted to the advertisement exposure target 400. As described above, when the key management unit 140 of the advertisement market server 100 encrypts the first key and the second key and transmits the encrypted first key and second key to the advertisement agency 300 and the advertisement exposure target 400, respectively, it is possible to prevent the sealed coin from being used by another user. The reason is that the first data in which the first key is encrypted may be decrypted only with the public key of the advertisement agency 300 and used, and the second data in which the second key is encrypted may be decrypted only with the public key of the advertisement exposure target 400 and used.

When a second transaction including the contents that the advertisement market server 100 transmits the key which unseals the sealed coin and converts the unsealed coin to the usable coin to the advertisement agency 300 and the advertisement exposure target 400 is generated, the second transaction may be verified in the plurality of nodes through the consensus algorithm. That is, the control unit 150 of the advertisement market server 100 transmits the second transaction to the plurality of nodes by controlling the transmission unit 112 to cause the second transaction to be verified in the plurality of nodes through the consensus algorithm.

The method of verifying the second transaction including the contents that the advertisement market server 100 transmits the key which unseals the sealed coin and converts the unsealed coin to the usable coin to the advertisement agency 300 and the advertisement exposure target 400 in the plurality of nodes through the consensus algorithm will be described with reference to FIG. 7.

Referring to FIG. 7, when the control unit 150 of the advertisement market server 100 transmits the first key and the second key, the control unit 150 may generate a second transaction 70 indicating that the advertisement market server 100 transmits the first key to the advertisement agency 300 and the advertisement market server 100 transmits the second key to the advertisement exposure target 400 (S401).

The second transaction 70 may include information 71 about key transmission details and coin possession state information 72 indicating the newest information about a current coin possession state.

For example, the information 71 about key transmission details may include information about transaction details, such as "the transmission of the first key from the advertisement market server to the advertisement agency" and "the transmission of the second key from the advertisement market server to the advertisement exposure target". Further, the information 71 about key transmission details may include information about transaction details (the transfer of the ownership of the coin), such as "transfer of the ownerships of the coins corresponding to the first key and the second key from the advertisement market server to the advertisement agency and the advertisement exposure target, respectively". Further, the coin possession state information 72 may include information about the number of current coins possessed by main agents transacting coins and/or keys and information about the sealed coin, such as "information indicating that the number of current coins of the advertisement agency is 150 coins" and "information indicating that the number of current coins of the advertisement exposure target is 30 coins".

In the description of FIG. 6, the 50 sealed coins possessed by the advertisement agency 300 may be unsealed with the first key and converted to usable coins. Further, the 30 sealed coins possessed by the advertisement exposure target 400 may be unsealed with the second key and converted to usable coins. Accordingly, the information indicating that the advertisement agency 300 possesses the control unit 150 coins and the advertisement exposure target 400 possesses the 30 coins may be recorded in the coin possession state information 72.

Since the second transaction 70 includes the coin possession state information 72, there is an effect in that the plurality of nodes may solve a double payment problem without checking a previous block.

According to several exemplary embodiments, information about an entity may be anonymously stored in the information 71 about coin transmission details and the coin possession state information 72. For example, when the contents that the advertisement market server transmits the first key to the advertisement agency in the information 71 about coin transmission details is recorded in the second transaction, only information about a public key of the advertisement market server, information about the first key, and information about a public key of the advertiser agency may be recorded in the second transaction. In the foregoing example, only a part of the information 71 about coin transmission details is described with the example, but the present disclosure is not limited thereto, and information about the entity in all of the information 71 about coin transmission details and the current coin possession state information 72 may be recorded as a public key of each entity. Accordingly, there is an effect in that personal information of the entities in the advertisement mediating system is protectable.

According to several exemplary embodiments, the control unit 150 of the advertisement market server 100 may sign the second transaction 70 with a secret key of the advertisement market server 100. Further, the control unit 150 may control the transmission unit 112 so as to transmit the second transaction 70 to the plurality of nodes (S402). Particularly, the control unit 150 of the advertisement market server 100 may control the transmission unit 112 so as to encrypt the second transaction 70 with a private key through the public key encryption algorithm and transmit the encrypted second transaction 70 to the node 53, and the node 53 may share the encrypted transaction with the plurality of nodes (S403). The plurality of nodes may decrypt the encrypted transaction with a public key of the advertisement market server 100. Since the plurality of nodes decrypts the encrypted transaction only with the public key of the advertisement market server 100, the plurality of nodes may recognize that the advertisement market server 100 encrypts and transmits the second transaction 70.

When the transaction is shared in operation S403, the plurality of nodes 53 to 57 included in the cloud 600 may have stored the information 71 about the coin transmission details and the coin possession state information 72 included in the shared transaction.

The block generation node 55 may collect the second transaction 70 shared in operation S403 and generate the second block (S404). Herein, the block generation node 55 may generate a block through at least one of a POW algorithm, a proof of stake algorithm, a PBFT algorithm, and a sieve algorithm. However, the present disclosure is not limited thereto, the block generation node 55 may also generate a block through a consensus algorithm different from the foregoing consensus algorithms (S404). Herein, any one node among all of the nodes included in the cloud 600 may be the block generation node 55, and a specific node does not become the block generation node. That is, a node which first finds a nonce value through the consensus algorithm among the plurality of nodes may become the block generation node.

In the meantime, the block generation node 55 may update a balance account of the transacting nodes by applying the second transaction 70 to the second block (S405). Herein, the balance account may be the coin possession state information 72.

Further, the block generation node 55 may propagate the second block of which the balance account is updated to the plurality of nodes 53 to 57 (S406).

The plurality of nodes 53 to 57 may share information about the second block propagated by the block generation node 55 (S407). The plurality of nodes 53 to 57 may verify validity of the second transaction through the consensus algorithm by sharing the information about the second block.

Particularly, the plurality of nodes 53 to 57 may recognize whether information included in a previous block is forged/falsified based on whether information on a hash value of the previous block included in the information about the second block is the same as information about a hash value of the previous block recorded in each of the plurality of nodes 53 to 57. Further, the plurality of nodes 53 to 57 may check whether information about a hash value of the second block is calculated by using information about a nonce value included in the information about the second block and verify validity of the transaction. When the validity of the transaction is verified by the foregoing method, there is an effect in that it is actually impossible to forge/falsify the transaction and the operation of verifying validity of the transaction is simple.

The information about the nonce value may be a predetermined value used when the hash value of the second block is generated through a hash algorithm (for example, Secure Hash Algorithm-256 (SHA-256)). The block generation node 55 may search for a nonce value which outputs a hash value smaller than a difficulty value included in a header of the second block while randomly changing the nonce value.

Further, the information about the hash value of the second block may be a value obtained by transforming the nonce value and the information included in the header of the second block to the hash value through the hash algorithm. Herein, the hash value may be a value smaller than the difficulty value included in the header of the second block.

The method of verifying validity of the transaction is a method used in the consensus algorithm, such as the POW algorithm, the proof of stake algorithm, the PBFT algorithm, and the sieve algorithm, of which the detailed description will be omitted.

When the validity of the second transaction is verified in the plurality of nodes 53 to 57, each of the plurality of nodes (all of the nodes included in the cloud except for the block generation node) may generate the second block, and record the second transaction in the second block. In this case, all of the nodes included in the cloud share information about the second block, so that the same second transaction may be recorded in the block. Accordingly, there is an effect in that it is actually impossible to forge/falsify the second transaction.

According to several exemplary embodiments, when each of the plurality of nodes 53 to 57 generates the second block, each of the plurality of nodes 53 to 57 may also update the balance account of the second block generated by each node by using the second transaction 70 of the shared information about the second block.

Referring back to FIG. 4, the control unit 150 of the advertisement market server 100 may control the transmission unit 112 so as to transmit a settlement request signal to the advertiser device 200 when the predetermined condition is satisfied (S115). The predetermined condition will be described below in detail with reference to FIGS. 9 and 10.

The advertiser device 200 may transmit a third key which unseals the sealed coin and converts the unsealed coin to a usable coin to the advertisement market server 100 according to the reception of the settlement request signal (S116). In this case, the control unit 150 of the advertisement market server 100 may convert the sealed first coin to the usable coin and use the first coin. Herein, the third key may be a sort of signal converting the sealed first coin to the usable coin. In the meantime, according to several exemplary embodiments, the reception unit 111 of the advertisement market server 100 may receive the third key encrypted through the public key encryption algorithm from the advertiser device 200.

Particularly, the transmission unit 112 of the advertisement market server 100 may generate a third public key and a private key corresponding to the third public key when transmitting the settlement request signal to the advertiser device 200. Herein, third data encrypted with the third public key may be decrypted only with the private key corresponding to the third public key. The advertiser device 200 may encrypt the third key with the third public key and transmit the third data encrypted with the third public key to the advertisement market server 100 according to the reception of the third public key and the settlement request signal. In this case, the control unit 150 of the advertisement market server 100 may extract the third key by decrypting the third key by using the private key corresponding to the third public key, and unseal the sealed third coin by using the third key. As described above, when the third key is encrypted with the public key of the advertisement market server 100 and the advertisement market server 100 receives the encrypted public key, it is possible to prevent the sealed first coin from being hacked and used by another user.

In the meantime, referring to FIG. 8, when the control unit 150 of the advertisement market server 100 receives the third key, the control unit 150 may generate a third transaction 80 indicating that the advertisement market server 100 receives the third key from the advertiser device 200 (S401).

The third transaction 80 may include information 81 about key transmission details and coin possession state information 82 indicating the newest information about a current coin possession state.

For example, the information 81 about key transmission details may include information about transaction details, such as "transmission of the third key from the advertiser device to the advertiser market server". Further, the coin possession state information 82 may include information about the number of current coins possessed by main agents transacting coins and/or keys and information about the sealed coin, such as "information indicating that the number of current coins of the advertisement market server is 120 coins".

In the description of FIG. 6, the 20 sealed coins possessed by the advertisement market server 100 may be unsealed with the third key and converted to usable coins. Accordingly, the information indicating that the advertisement market server 100 possesses the 120 coins may be recorded in the coin possession state information 82.

According to several exemplary embodiments, information about an entity may be anonymously stored in the information 81 about coin transmission details and the coin possession state information 82. For example, when the contents that the advertisement device transmits the third key to the advertisement market server in the information 81 about coin transmission details is recorded in the third transaction, only information about a public key of the advertisement device, information about the third key, and information about a public key of the advertiser market server may be recorded in the third transaction. In the foregoing example, only a part of the information 81 about coin transmission details is described with the example, but the present disclosure is not limited thereto, and information about the entity in all of the information 81 about coin transmission details and the current coin possession state information 82 may be recorded as a public key of each entity. Accordingly, there is an effect in that personal information of the entities in the advertisement mediating system is protectable.

According to several exemplary embodiments, the control unit 150 of the advertisement market server 100 may control the transmission unit 112 so as to transmit the third transaction 80 to the plurality of nodes by signing the third transaction 80 with a secret key of the advertisement market server 100 (S502). Particularly, the control unit 150 of the advertisement market server 100 may control the transmission unit 112 so as to encrypt the third transaction 80 with a private key through the public key encryption algorithm and transmit the encrypted third transaction 80 to the node 53, and the node 53 may share the encrypted transaction with the plurality of nodes (S503). The plurality of nodes may decrypt the encrypted transaction with a public key of the advertisement market server 100. Since the plurality of nodes decrypts the encrypted transaction only with the public key of the advertisement market server 100, the plurality of nodes may recognize that the advertisement market server 100 encrypts and transmits the third transaction 80.

When the transaction is shared in operation S403, the plurality of nodes 53 to 57 included in the cloud 600 may have stored the information 71 about the coin transmission details and the coin possession state information 82 included in the shared transaction.

The block generation node 55 may collect the third transaction 80 shared in operation S503 and generate the third block (S504). Herein, the block generation node 55 may generate a block through at least one of a POW algorithm, a proof of stake algorithm, a PBFT algorithm, and a sieve algorithm. However, the present disclosure is not limited thereto, the block generation node 55 may also generate a block through a consensus algorithm different from the foregoing consensus algorithms (S504). Herein, any one node among all of the nodes included in the cloud 600 may be the block generation node 55, and a specific node does not become the block generation node. That is, a node which first finds a nonce value through the consensus algorithm among the plurality of nodes may become the block generation node.

In the meantime, the block generation node 55 may update a balance account of the transacting nodes by applying the third transaction 80 to the third block (S505). Herein, the balance account may be the coin possession state information 82.

The block generation node 55 may propagate the third block of which the balance account is updated to the plurality of nodes 53 to 57 (S506).

The plurality of nodes 53 to 57 may share information about the third block propagated by the block generation node 55 (S507). The plurality of nodes 53 to 57 may verify validity of the third transaction through the consensus algorithm by sharing the information about the third block.

Particularly, the plurality of nodes 53 to 57 may recognize whether information included in a previous block is forged/falsified based on whether information on a hash value of the previous block included in the information about the third block is the same as information about a hash value of the previous block recorded in each of the plurality of nodes 53 to 57. Further, the plurality of nodes 53 to 57 may check whether information about the hash value of the third block is calculated by using information about a nonce value included in the information about the third block and verify validity of the transaction. When the validity of the transaction is verified by the foregoing method, there is an effect in that it is actually impossible to forge/falsify the transaction and the operation of verifying validity of the transaction is simple.

The information about the nonce value may be a predetermined value used when the hash value of the third block is generated through a hash algorithm (for example, Secure Hash Algorithm-256 (SHA-256)). The block generation node 55 may search for a nonce value which outputs a hash value smaller than a difficulty value included in a header of the third block while randomly changing the nonce value.

The information about the hash value of the third block may be a value obtained by transforming the nonce value and the information included in the header of the third block to the hash value through the hash algorithm. Herein, the hash value may be a value smaller than the difficulty value included in the header of the third block.

The method of verifying validity of the transaction is a method used in the consensus algorithm, such as the POW algorithm, the proof of stake algorithm, the PBFT algorithm, and the sieve algorithm, of which the detailed description will be omitted.

When the validity of the third transaction is verified in the plurality of nodes 53 to 57, each of the plurality of nodes (all of the nodes included in the cloud except for the block generation node) may generate the third block, and record the third transaction in the third block. In this case, all of the nodes included in the cloud share information about the third block, so that the same third transaction may be recorded in the block. Accordingly, there is an effect in that it is actually impossible to forge/falsify the third transaction.

According to several exemplary embodiments, when each of the plurality of nodes 53 to 57 generates the third block, each of the plurality of nodes 53 to 57 may also update the balance account of the third block generated by each node by using the third transaction 80 of the shared information about the third block.

As described above with reference to FIGS. 4 to 8, when the advertiser device 200 (or the advertisement market server 100) first pays the sealed coin to the advertisement market server 100 (or the advertisement agency 300 and the advertisement exposure target 400) and then automatically provides the key unsealing the sealed coin through the smart contract when the predetermined condition is satisfied, there is an effect in that it is possible to provide users of the advertisement transaction system with reliability that the coin is certainly provided.

That is, the advertisement mediating method based on the block chain may provide the advertisement mediating method having high reliability between the advertisement market, the advertiser, the advertisement agency, and the advertisement exposure target.

Figure 9:
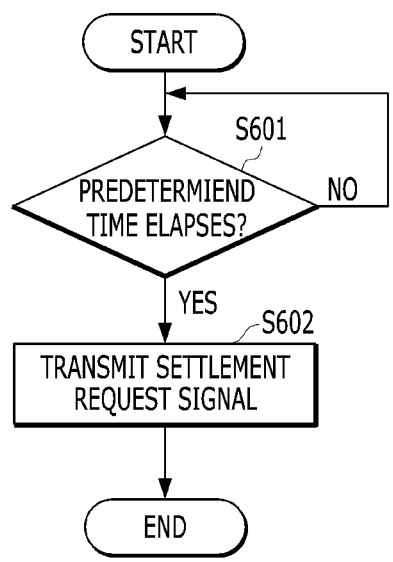
FIG. 9 is a flowchart for describing an example of a condition of a transmission of a settlement request signal according to several exemplary embodiments.

FIG. 9 is a flowchart for describing an example of a condition of the transmission of the settlement request signal according to several exemplary embodiments.

First, referring to operation S115 of FIG. 4, the control unit 150 of the advertisement market server 100 may control the transmission unit 112 so as to transmit the settlement request information to the advertiser device 200 when the predetermined condition is satisfied.

According to several exemplary embodiments, the control unit 150 of the advertisement market server 100 may recognize whether a predetermined time (for example, six months) elapses (S601). That is, the control unit 150 of the advertisement market server 100 may recognize whether the predetermined condition is satisfied based on whether the predetermined time elapses.

Herein, the predetermined time may be a time included in the advertisement transaction request information received from the advertiser device 200, and may also be a time automatically set by the advertisement market server 100.

When the predetermined time elapses (S601, YES), the control unit 150 of the advertisement market server 100 may recognize that the predetermined condition is satisfied, and control the transmission unit 112 so as to transmit the settlement request signal to the advertiser device 200 (S602).

In the meantime, when the predetermined time does not elapse (S601, NO), the control unit 150 of the advertisement market server 100 may recognize that the predetermined condition is not satisfied, and stand by until the predetermined time elapses.

Figure 10:
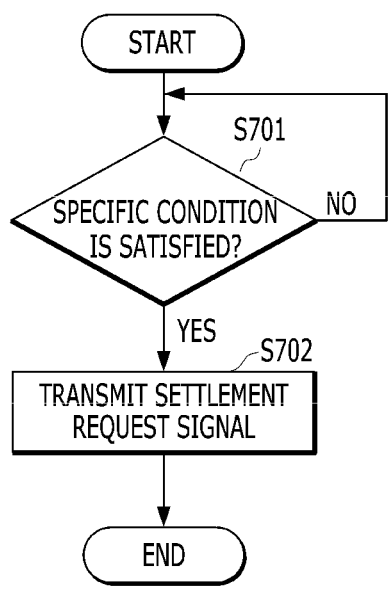
FIG. 10 is a flowchart for describing another example of a condition of a transmission of a settlement request signal according to several exemplary embodiments.

FIG. 10 is a flowchart for describing another example of a condition of the transmission of the settlement request signal according to several exemplary embodiments.

First, referring to operation S115 of FIG. 4, the control unit 150 of the advertisement market server 100 may control the transmission unit 112 so as to transmit the settlement request information to the advertiser device 200 when the predetermined condition is satisfied.

According to several exemplary embodiments, the control unit 150 of the advertisement market server 100 may recognize whether a specific condition is satisfied (S701). That is, the control unit 150 of the advertisement market server 100 may recognize whether the predetermined condition is satisfied based on whether the specific condition is satisfied.

Herein, the specific condition may be a specific condition set by the advertiser device 200.

The advertiser device 200 may set the specific condition as "the specific condition is satisfied when the number of advertisement agencies receiving the coin and the number of advertisement exposure targets correspond to the predetermined number (for example, 100)". In this case, the control unit 150 of the advertisement market server 100 may continuously check whether the specific condition is satisfied by receiving information about the specific condition from the advertiser device 200. When the specific condition is satisfied (S701, YES), the control unit 150 of the advertisement market server 100 may control the transmission unit 112 so as to transmit the settlement request signal to the advertiser device 200.

For example, when the control unit 150 of the advertisement market server 100 recognizes that the number of advertisement agencies receiving the coin and the number of advertisement exposure targets correspond to the predetermined number, the control unit 150 of the advertisement market server 100 may recognize that the specific condition is satisfied.

When the specific condition is not satisfied (S701, NO), the control unit 150 of the advertisement market server 100 may stand by until the predetermined specific condition is satisfied.

The orders of the operations of FIGS. 4 to 10 may be changed as necessary, and at least one operation and/or configuration may be omitted or added. Further, the forgoing operation and/or configuration is simply the exemplary embodiment of the present disclosure, and the scope of the present disclosure is not limited thereto.

Figure 11:
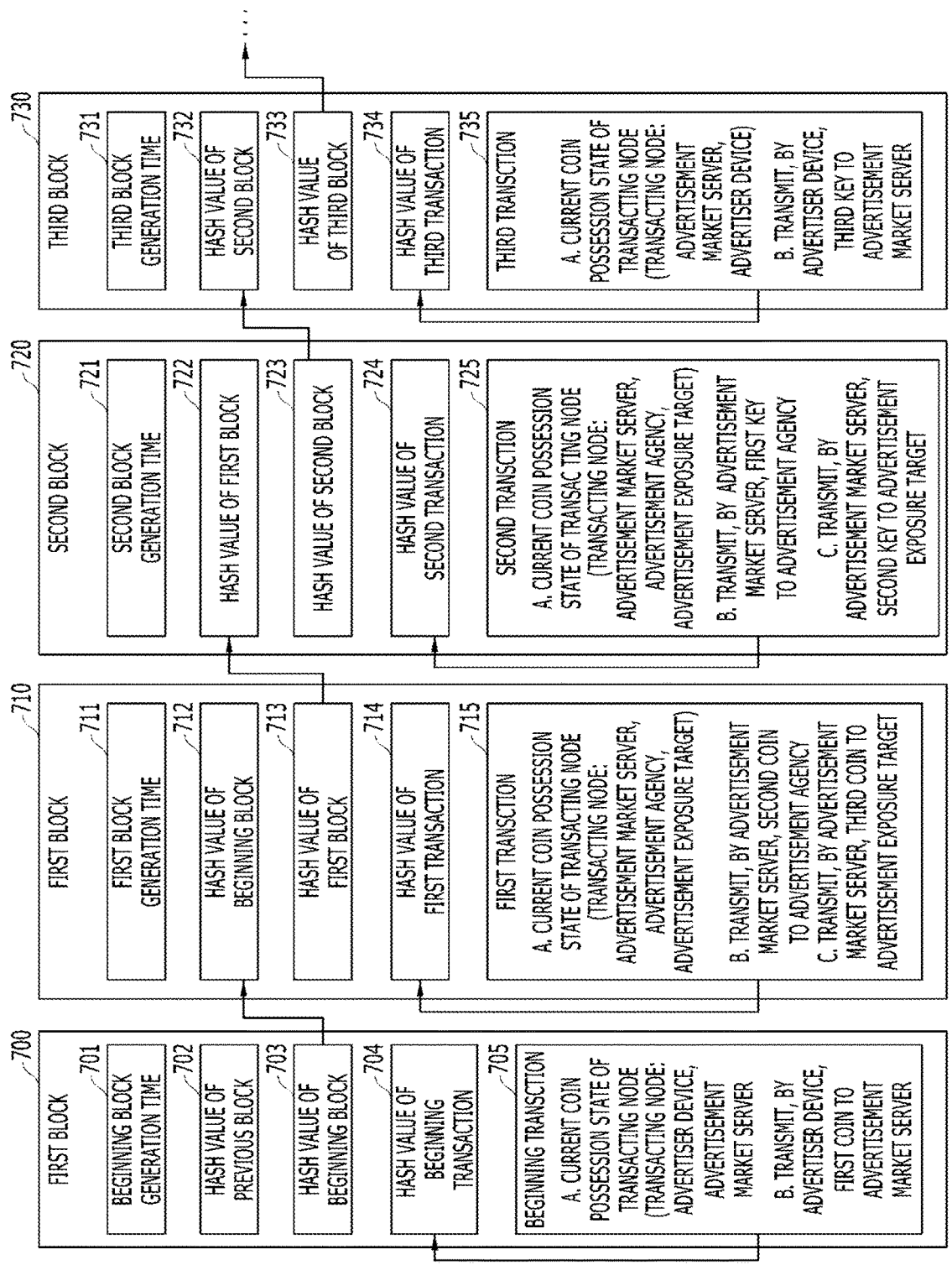
FIG. 11 is a diagram for describing examples of blocks according to several exemplary embodiments.

FIG. 11 is a diagram for describing examples of blocks according to several exemplary embodiments.

According to several exemplary embodiments, a beginning block 700 may include a beginning block generation time 701, a hash value 702 of a previous block, a hash value 703 of the beginning block, a hash value 704 of the beginning transaction, and the beginning transaction 705. Herein, the information 51 about coin transmission details and the coin possession state information 52 indicating newest information about the current coin possession state described with reference to FIG. 5 may be included in the beginning transaction 705.

A first block 710 may include a first block generation time 711, a hash value 712 of the beginning block, a hash value 713 of the first block, a hash value 714 of a first transaction, and a first transaction 715. Herein, the information 61 about coin transmission details and the coin possession state information 62 indicating newest information about the current coin possession state described with reference to FIG. 6 may be included in the first transaction 715.

A second block 720 may include a second block generation time 721, a hash value 722 of the first block, a hash value 723 of the second block, a hash value 724 of a second transaction, and a second transaction 725. Herein, the information 71 about key transmission details and the coin possession state information 72 indicating newest information about the current coin possession state described with reference to FIG. 7 may be included in the second transaction 725.

A third block 730 may include a third block generation time 731, a hash value 732 of the third block, a hash value 733 of the third block, a hash value 734 of a third transaction, and a third transaction 735. Herein, the information 81 about key transmission details and the coin possession state information 82 indicating newest information about the current coin possession state described with reference to FIG. 7 may be included in the third transaction 735.

Each of the beginning transaction, and the first to third transactions may include at least one of the information about coin transmission details, the information about key transmission details, and the coin possession state information.

The hash value 704 of the beginning transaction and the hash values 714, 724, and 734 of the first to third transactions may be generated by using the Merkle Root.

For example, when the block generation node generates the hash value 704 of the beginning transaction, the block generation node may generate the information indicating that the advertiser device transmits the first coin to the advertisement market server included in the information about coin transmission details as a first Merkle hash value through the hash algorithm. The block generation node may generate the current coin possession state of the advertiser device as a second Merkle hash value through the hash algorithm. The block generation node may generate the current coin possession state of the advertisement market server as a third Merkle hash value through the hash algorithm. The block generation node may generate a fourth Merkle hash value by using the first Merkle hash value and the second Merkle hash value. Further, the block generation node may generate the hash value 704 of the beginning transaction by using the third Merkle hash value and the fourth Merkle hash value. As described above, when the hash value 704 of the beginning transaction is generated through the Merkle Root, a completely different hash value is generated when any one of the information of the transaction is forged or falsified, so that it is possible to verify integrity of the transaction.

The block generation node may generate the hash value 714 of the first transaction, the hash value 724 of the second transaction, and the hash value 734 of the third transaction by the same method as the method of generating the hash value 704 of the first transaction through the Merkle Root.

According to several exemplary embodiments, the block may be generated at a specific time interval (for example, 10 minutes). Herein, the specific time may be changed based on difficulty of the generation of the block and the like. Further, the block may store the transaction details occurring for a specific time interval.

In the description below, the present disclosure will be described based on the first block. The terms, "the beginning", "a first", "a second", and "a third" expressed in the description of FIG. 11 are used for easily discriminating the plurality of blocks. Further, in the configuration included in the block, the identically used terms, such as a "block generation time", a "hash value of the block", a "hash value of the transaction", and the "transaction" perform the same role. However, information stored in each of the plurality of blocks may be different.

According to several exemplary embodiments, the first block 710 is a block utilized in the block chain technology, and may be recorded with all of the contents (for example, transaction details and the number of currently possessed coins) related to information about the advertisement market server 100, information about the advertiser device 200, information about the advertisement agency 300, and information about the advertisement exposure target 400 as the transaction.

First, the first block 710 may include information about the generation time 711 of the block, information about the hash value 712 of the beginning block 700 that is the previous block, information about the hash value 713 of the first block 710, the transaction 715, and the hash value 714 of the transaction. However, the constituent elements of the first block 710 are not essential for implementing the first block 710, so that the first block 710 may have constituent elements more or less than the listed constituent elements.

In the meantime, although not illustrated in the drawing, the first block 710 may also further include information about a version of the first block 710, information about a nonce, and information about a difficulty target.

The information about the version of the first block 710, the nonce, the information about the generation time of the first block 710, the information about the hash value 712 of the previous block (beginning block), consensus meta data (not illustrated), block meta data (not illustrated), the information about the hash value 713 of the first block, and the difficulty target may be included in the header of the first block 710. Further, the first transaction 715 may be included in a body of the first block 710.

The information about the version of the first block may be version information of the block chain program creating the header of the current block.

The nonce is a value used when a hash value is calculated during a process of creating a block, and corresponds to a nonce of the general block chain technology.

The difficulty target may be expressed by bits. Bits may mean a difficulty hash target value.

The information about the generation time 711 of the first block 710 may be information about a time (For example, Apr. 2, 2018, 15 pm) at which the first block is generated.

The information about the hash value 712 of the beginning block that is the previous block may be information generated by transforming the information (for example, the generation time 710 of the beginning block and the hash value 704 of the beginning transaction that is the previous block) included in the header of the previous block to a hash value. The information about the hash value 712 of the previous block may be varied according to the kind of hash algorithm and a length and a value (for example, 256 bits and 512 bits) of characters.

Accordingly, it may be considered that the beginning block 700 and the first block 710 are connected by a chain. That is, the beginning block 700 and the first block 710 may form a block chain. According to the foregoing contents, there is an effect in that data of the block chain structure cannot be forged.

When the information about the hash value 712 of the previous block is included in the first block 710, it is possible to prevent the transaction from being forged/falsified and verity integrity of the transaction.

The hash value means the hash value derived through the hash algorithm. The hash algorithm refers to the algorithm that changes a sentence to a value having a predetermined length regardless of a length of the sentence. When the contents of the sentence are completely the same, the hash algorithm has the completely same hash value. However, when even a part of the contents of a sentence is different, the hash algorithm has a completely different hash value. Accordingly, when the hash algorithm is used, there is an effect in that it is actually impossible to forge/falsify the transaction.

Figure 12:
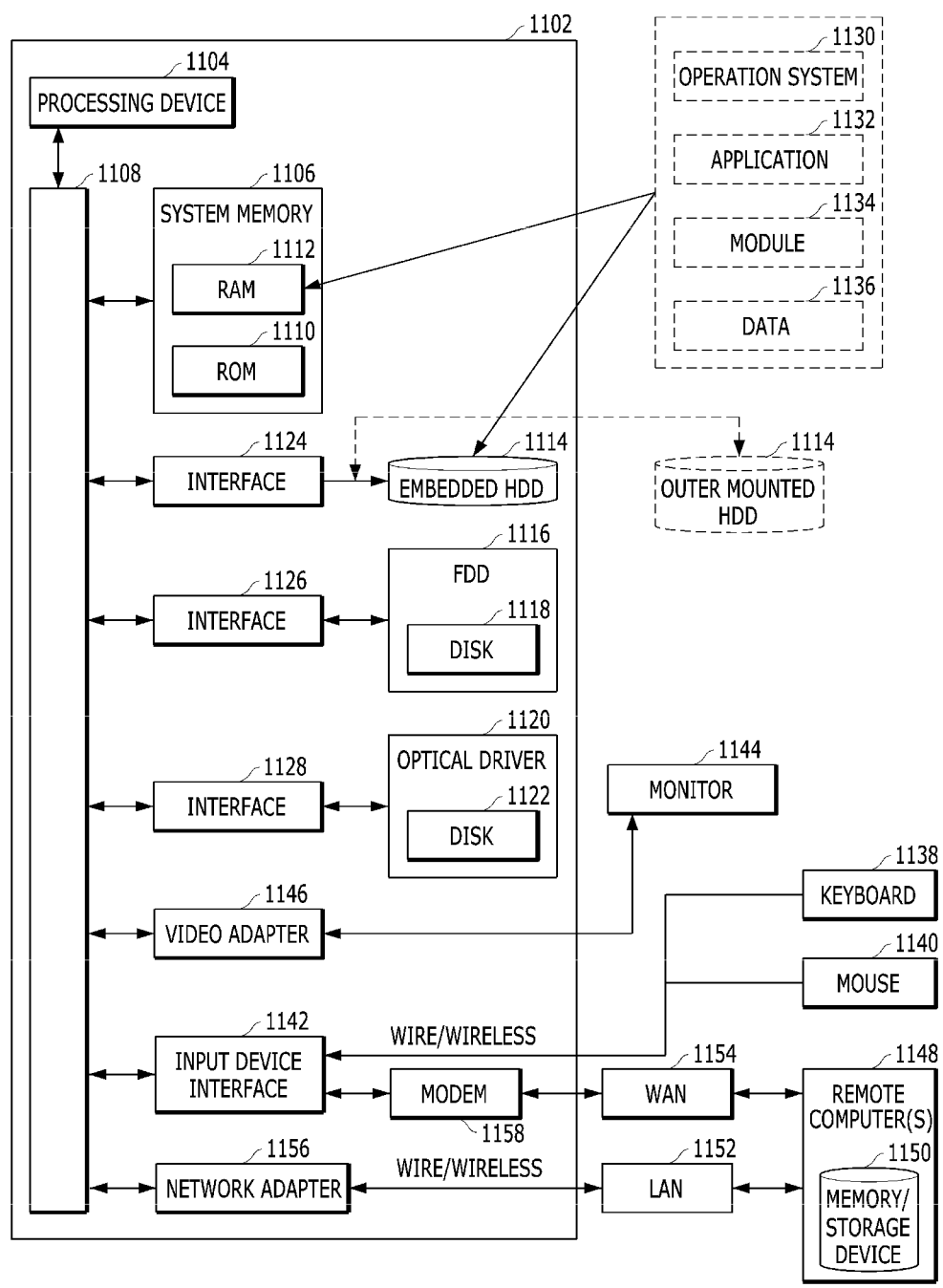
FIG. 12 is a simple and general schematic diagram illustrating an example of a computing environment in which exemplary embodiments of the contents of the present disclosure are implementable.

FIG. 12 is a simple and general schematic diagram illustrating an example of a computing environment in which exemplary embodiments of the contents of the present disclosure are implementable.

The present disclosure has been generally described in relation to a computer executable command executable in one or more computers, but those skilled in the art will appreciate well that the present disclosure may be implemented in combination with other program modules and/or in a combination of hardware and software.

In general, in the present specification, a module includes a routine, a procedure, a program, a component, a data structure, and the like performing a specific task or implementing a specific abstract data type. Further, those skilled in the art will appreciate well that the method of the present disclosure may be carried out by a personal computer, a hand-held computing device, a microprocessor-based or programmable home appliance (each of which may be connected with one or more relevant devices and be operated), and other computer system configurations, as well as a single-processor or multiprocessor computer system, a mini computer, and a main frame computer.

The exemplary embodiments of the present disclosure may be carried out in a distribution computing environment, in which certain tasks are performed by remote processing devices connected through a communication network. In the distribution computing environment, a program module may be positioned in both a local memory storage device and a remote memory storage device.

The computer generally includes various computer readable media. A computer accessible medium may be a computer readable medium regardless of the kind of medium, and the computer readable medium includes volatile and non-volatile media, transitory and non-non-transitory media, and portable and non-portable media. As a non-limited example, the computer readable medium may include a computer readable storage medium and a computer readable transport medium.

The computer readable storage medium includes volatile and non-volatile media, transitory and non-non-transitory media, and portable and non-portable media constructed by a predetermined method or technology, which stores information, such as a computer readable command, a data structure, a program module, or other data. The computer readable storage medium includes a read only memory (RAM), a read only memory (ROM), electrically erasable and programmable ROM (EEPROM), a flash memory, or other memory technologies, a compact disc (CD)-ROM, a digital video disk (DVD), or other optical disk storage devices, a magnetic cassette, a magnetic tape, a magnetic disk storage device, or other magnetic storage device, or other predetermined media, which are accessible by a computer and are used for storing desired information, but is not limited thereto.

The computer readable transport medium generally includes all of the information transport media, such as a carrier wave or other transport mechanisms, which implements a computer readable command, a data structure, a program module, or other data in a modulated data signal. The modulated data signal means a signal, of which one or more of the characteristics are set or changed so as to encode information within the signal. As a non-limited example, the computer readable transport medium includes a wired medium, such as a wired network or a direct-wired connection, and a wireless medium, such as sound, radio frequency (RF), infrared rays, and other wireless media. A combination of the predetermined media among the foregoing media is also included in a range of the computer readable transport medium.

An illustrative environment 1100 including a computer 1102 and implementing several aspects of the present disclosure is illustrated, and the computer 1102 includes a processing device 1104, a system memory 1106, and a system bus 1108. The system bus 1108 connects system components including the system memory 1106 (not limited thereto) to the processing device 1104. The processing device 1104 may be a predetermined processor among various common processors. A dual processor and other multi-processor architectures may also be used as the processing device 1104.

The system bus 1108 may be a predetermined one among several types of bus structure, which may be additionally connectable to a local bus using a predetermined one among a memory bus, a peripheral device bus, and various common bus architectures. The system memory 1106 includes a ROM 1110, and a RAM 1112. A basic input/output system (BIOS) is stored in a non-volatile memory 1110, such as a ROM, an erasable and programmable ROM (EPROM), and an EEPROM, and the BIOS includes a basic routine helping a transport of information among the constituent elements within the computer 1102 at a time, such as starting. The RAM 1112 may also include a high-rate RAM, such as a static RAM, for caching data.

The computer 1102 also includes an embedded hard disk drive (HDD) 1114 (for example, enhanced integrated drive electronics (EIDE) and serial advanced technology attachment (SATA))—the embedded HDD 1114 may be configured for outer mounted usage within a proper chassis (not illustrated), a magnetic floppy disk drive (FDD) 1116 (for example, which is for reading data from a portable diskette 1118 or recording data in the portable diskette 1118), and an optical disk drive 1120 (for example, which is for reading a CD-ROM disk 1122, or reading data from other high-capacity optical media, such as a DVD, or recording data in the high-capacity optical media). A hard disk drive 1114, a magnetic disk drive 1116, and an optical disk drive 1120 may be connected to a system bus 1108 by a hard disk drive interface 1124, a magnetic disk drive interface 1126, and an optical drive interface 1128, respectively. An interface 1124 for implementing an outer mounted drive includes, for example, at least one of or both a universal serial bus (USB) and the Institute of Electrical and Electronics Engineers (IEEE) 1394 interface technology.

The drives and the computer readable media associated with the drives provide non-volatile storage of data, data structures, computer executable commands, and the like. In the case of the computer 1102, the drive and the medium correspond to the storage of predetermined data in an appropriate digital form. In the description of the computer readable storage media, the HDD, the portable magnetic disk, and the portable optical media, such as a CD, or a DVD, are mentioned, but those skilled in the art will appreciate well that other types of compute readable storage media, such as a zip drive, a magnetic cassette, a flash memory card, and a cartridge, may also be used in the illustrative operation environment, and the predetermined medium may include computer executable commands for performing the methods of the present disclosure.

A plurality of program modules including an operation system 1130, one or more application programs 1132, other program modules 1134, and program data 1136 may be stored in the drive and the RAM 1112. An entirety or a part of the operation system, the application, the module, and/or data may also be cached in the RAM 1112. It will be appreciated well that the present disclosure may be implemented by several commercially available operating systems or a combination of the operating systems.

A user may input a command and information to the computer 1102 through one or more wired/wireless input devices, for example, a keyboard 1138 and a pointing device, such as a mouse 1140. Other input devices (not illustrated) may be a microphone, an IR remote controller, a joystick, a game pad, a stylus pen, a touch screen, and the like. The foregoing and other input devices are frequently connected to the processing device 1104 through an input device interface 1142 connected to the system bus 1108, but may be connected by other interfaces, such as a parallel port, an IEEE 1394 serial port, a game port, a USB port, an IR interface, and other interfaces.

A monitor 1144 or other types of display devices are also connected to the system bus 1108 through an interface, such as a video adapter 1146. In addition to the monitor 1144, the computer generally includes other peripheral output devices (not illustrated), such as a speaker and a printer.

The computer 1102 may be operated in a networked environment by using a logical connection to one or more remote computers, such as remote computer(s) 1148, through wired and/or wireless communication. The remote computer(s) 1148 may be a workstation, a server computer, a router, a personal computer, a portable computer, a microprocessor-based entertainment device, a peer device, or other general network nodes, and generally includes some or an entirety of the constituent elements described for the computer 1102, but only a memory storage device 1150 is illustrated for simplicity. The illustrated logical connection includes a wired/wireless connection to a local area network (LAN) 1152 and/or a larger network, for example, a wide area network (WAN) 1154. The LAN and WAN networking environments are general in an office and a company, and make an enterprise-wide computer network, such as an Intranet, easy, and all of the LAN and WAN networking environments may be connected to a worldwide computer network, for example, Internet.

When the computer 1102 is used in the LAN networking environment, the computer 1102 is connected to the local network 1152 through a wired and/or wireless communication network interface or an adapter 1156. The adapter 1156 may make wired or wireless communication to the LAN 1152 easy, and the LAN 1152 may also include a wireless access point installed therein for the communication with the wireless adapter 1156. When the computer 1102 is used in the WAN networking environment, the computer 1102 may include a modem 1158, is connected to a communication server on a WAN 1154, or includes other means setting communication through the WAN 1154 via the Internet. The modem 1158, which may be an embedded or outer-mounted and wired or wireless device, is connected to the system bus 1108 through a serial port interface 1142. In the networked environment, the program modules described for the computer 1102 or some of the program modules may be stored in a remote memory/storage device 1150. The illustrated network connection is illustrative, and those skilled in the art will appreciate well that other means setting a communication link between the computers may be used.

The computer 1102 performs an operation of communicating with a predetermined wireless device or entity, for example, a printer, a scanner, a desktop and/or portable computer, a portable data assistant (PDA), a communication satellite, predetermined equipment or place related to a wirelessly detectable tag, and a telephone, which is disposed by wireless communication and is operated. The operation includes a wireless fidelity (Wi-Fi) and Bluetooth wireless technology at least. Accordingly, the communication may have a pre-defined structure, such as a network in the related art, or may be simply ad hoc communication between at least two devices.

The Wi-Fi enables a connection to the Internet and the like even without a wire. The Wi-Fi is a wireless technology, such as a cellular phone, which enables the device, for example, the computer, to transmit and receive data indoors and outdoors, that is, in any place within a communication range of a base station. A Wi-Fi network uses a wireless technology, which is called IEEE 802.11 (a, b, g, etc.) for providing a safe, reliable, and high-rate wireless connection. The Wi-Fi may be used for connecting to the computer, the Internet, and the wired network (IEEE 802.3 or Ethernet is used). The Wi-Fi network may be operated at, for example, a data rate of 11 Mbps (802.11a) or 54 Mbps (802.11b) in an unauthorized 2.4 and 5 GHz wireless band, or may be operated in a product including both bands (dual bands).

Those skilled in the art will appreciate that the various illustrative logical blocks, modules, processors, means, circuits, and algorithm operations described in relation to the exemplary embodiments disclosed herein may be implemented by electronic hardware (for convenience, called "software" herein), various forms of program or design code, or a combination thereof. In order to clearly describe compatibility of the hardware and the software, various illustrative components, blocks, modules, circuits, and operations are generally illustrated above in relation to the functions of the hardware and the software. Whether the function is implemented as hardware or software depends on design limits given to a specific application or an entire system. Those skilled in the art may perform the function described by various schemes for each specific application, but it shall not be construed that the determinations of the performance depart from the scope of the present disclosure.

Various exemplary embodiments presented herein may be implemented by a method, a device, or a manufactured article using a standard programming and/or engineering technology. A term "manufactured article" includes a computer program, a carrier, or a medium accessible from a predetermined computer-readable device. For example, the computer-readable storage medium includes a magnetic storage device (for example, a hard disk, a floppy disk, and a magnetic strip), an optical disk (for example, a CD and a DVD), a smart card, and a flash memory device (for example, an EEPROM, a card, a stick, and a key drive), but is not limited thereto. The term "machine-readable medium" includes a wireless channel and various other media, which are capable of storing, possessing, and transporting a command(s) and/or data, but is not limited thereto.

It shall be understood that a specific order or a hierarchical structure of the operations included in the presented processes is an example of illustrative accesses. It shall be understood that a specific order or a hierarchical structure of the operations included in the processes may be re-arranged within the scope of the present disclosure based on design priorities. The accompanying method claims provide various operations of elements in a sample order, but it does not mean that the claims are limited to the presented specific order or hierarchical structure.

The description of the presented exemplary embodiments is provided so as for those skilled in the art to use or carry out the present disclosure. Various modifications of the exemplary embodiments may be apparent to those skilled in the art, and general principles defined herein may be applied to other exemplary embodiments without departing from the scope of the present disclosure. Accordingly, the present disclosure is not limited to the exemplary embodiments suggested herein, and shall be interpreted within the broadest meaning range consistent to the principles and new characteristics suggested herein.

What is claimed is:

1. A non-transitory computer readable medium containing a computer program,
   wherein the computer program includes commands which cause a computer to execute steps based on a block chain, the steps comprising:
   receiving, by a reception unit of an advertisement market server via a wired or wireless communication network adapter, first information about the advertisement transaction request, second information about a reward payment condition and a sealed first coin from an advertiser device;
   receiving, by the reception unit via the wired or wireless communication network adapter, advertisement selection information from an advertisement agency;
   if the advertisement selection information corresponds to the first information, generating, by an advertisement management unit of the advertisement market server, an advertisement page based on the first information;
   transmitting, by the advertisement management unit via the wired or wireless communication network adapter, the advertisement page to the advertisement agency so that the advertisement page is exposed through the advertisement agency;
   transmitting, by a coin distributing unit of the advertisement market server via the wired or wireless communication network adapter, a sealed second coin to the advertisement agency and a sealed third coin to an advertisement exposure target upon receiving an application signal from the advertisement exposure target based on the second information through the advertisement page, wherein the sealed second coin and the sealed third coin are digital coins which have value while being sealed in an unusable state for a demander;
   wherein the reception unit, the advertisement management unit, and the coin distributing unit each comprises a software module disposed on the advertisement market server or another server;
   if the reward payment condition is satisfied, transmitting via the wired or wireless communication network adapter a first key corresponding to the sealed second coin to the advertisement agency and a second key corresponding to the sealed third coin to the advertisement exposure target, wherein the reward payment condition is satisfied when an action corresponding to the application signal is performed by the advertisement exposure target, and wherein the first key is for unsealing the sealed second coin to convert the sealed second coin into a usable coin and the second key is for unsealing the sealed third coin to convert the sealed third coin into a usable coin; and wherein the second information comprises at least one of:

information relating to number of the sealed second coin and number of the sealed third coin;

information relating to a division of the sealed first coin; and information relating to a transmission of the first key and the second key.

2. The non-transitory computer readable medium of claim 1, wherein the steps further comprise:

transmitting a settlement request signal to the advertiser device; and receiving a third key corresponding to the sealed first coin from the advertiser device.

3. The non-transitory computer readable medium of claim 2, wherein the transmitting a settlement request signal to the advertiser device comprises:

if a number of the advertisement agency that received the sealed second coin and the advertisement exposure target that received the sealed third coin corresponds to a predetermined number, transmitting the settlement request signal to the advertiser device.

4. The non-transitory computer readable medium of claim 2, wherein the receiving a third key corresponding to the sealed first key comprises:

if the third key is received, generating a third transaction;

transmitting the third transaction to a plurality of nodes to cause the third transaction to be recorded to a third block at each of the plurality of nodes.

5. The non-transitory computer readable medium of claim 4, wherein the third transaction is recognized as being verified by a consensus algorithm when a third nonce value is recognized as valid in each of the plurality of nodes after any one of the plurality of nodes extracts the third nonce value satisfying a predetermined third condition.

6. The non-transitory computer readable medium of claim 5, wherein the predetermined third condition is satisfied when a hash value of the third block is smaller than a difficulty value of the third block, and wherein the hash value of the third block is generated when information stored in a header of the third block and the third nonce value are transformed through the hash algorithm.

7. The non-transitory computer readable medium of claim 2, wherein the transmitting a settlement request signal to the advertiser device comprises:

generating a third public key and a private key corresponding to the third public key; and transmitting the third public key to the advertiser device together with the settlement request signal.

8. The non-transitory computer readable medium of claim 7, wherein the receiving a third key corresponding to the sealed first key from the advertiser device comprises:

receiving third data obtained by encrypting the third key with the third public key;

decrypting the third data using the private key and extracting the third key; and unsealing the sealed first coin using the third key.

9. The non-transitory computer readable medium of claim 1, wherein the transmitting a sealed second coin to the advertisement agency and a sealed third coin to an advertisement exposure target comprises:

if the sealed second coin and the sealed third coin are transmitted, generating a first transaction; and transmitting the first transaction to a plurality of nodes to cause the first transaction to be recorded to a first block at each of the plurality of nodes.

10. The non-transitory computer readable medium of claim 9, wherein the first transaction is recognized as being verified by a consensus algorithm when a first nonce value is recognized as valid in each of the plurality of nodes after any one of the plurality of nodes extracts the first nonce value satisfying a predetermined first condition.

11. The non-transitory computer readable medium of claim 10, wherein the predetermined first condition is satisfied when a hash value of the first block is smaller than a difficulty value of the first block, and wherein the hash value of the first block is generated when information stored in a header of the first block and the first nonce value are transformed through the hash algorithm.

12. The non-transitory computer readable medium of claim 1, wherein the transmitting a first key corresponding to the sealed second coin to the advertisement agency and a second key corresponding to the sealed third coin to the advertisement exposure target comprises:

if the first key and the second key are transmitted, generating a second transaction;

transmitting the second transaction to a plurality of nodes to cause the second transaction to be recorded to a second block at each of the plurality of nodes.

13. The non-transitory computer readable medium of claim 12, wherein the second transaction is recognized as being verified by a consensus algorithm when a second nonce value is recognized as valid in each of the plurality of nodes after any one of the plurality of nodes extracts the second nonce value satisfying a predetermined second condition.

14. The non-transitory computer readable medium of claim 13, wherein the predetermined second condition is satisfied when a hash value of the second block is smaller than a difficulty value of the second block, and wherein the hash value of the second block is generated when information stored in a header of the second block and the second nonce value are transformed through the hash algorithm.

15. The non-transitory computer readable medium of claim 1, wherein the transmitting a first key corresponding to the sealed second coin to the advertisement agency and a second key corresponding to the sealed third coin to the advertisement exposure target comprises:

if the reward payment condition is satisfied, receiving a first public key of the advertisement agency and a second public key of the advertisement exposure target;

transmitting first data obtained by encrypting the first key with the first public key to the advertisement agency; and transmitting second data obtained by encrypting the second key with the second public key to the advertisement exposure target.

16. The non-transitory computer readable medium of claim 1, wherein the sealed first coin, the sealed second coin and the sealed third coin are coins in a frozen state, wherein the frozen state is a state that is not transmitted to another entity within the block chain network unit the hold command is released.

17. The non-transitory computer readable medium of claim 1, wherein the reward payment condition is satisfied if the advertisement exposure target accesses a website for installing a specific application through the advertisement page.

18. The non-transitory computer readable medium of claim 1, wherein the reward payment condition is satisfied if the advertisement exposure target has installed a specific game application through the advertisement page and then the advertisement exposure target has achieved a preset level in the specific game application.

* * * * *